(12) United States Patent
Anzawa

(10) Patent No.: US 7,470,879 B2
(45) Date of Patent: Dec. 30, 2008

(54) OPTICAL PICKUP, INFORMATION PROCESSING APPARATUS AND SIGNAL PROCESSING METHOD

(75) Inventor: Takuya Anzawa, Kanagawa (JP)

(73) Assignee: Sony Corporation, Tokyo (JP)

(*) Notice: Subject to any disclaimer, the term of this patent is extended or adjusted under 35 U.S.C. 154(b) by 157 days.

(21) Appl. No.: 11/466,220

(22) Filed: Aug. 22, 2006

(65) Prior Publication Data

US 2007/0045509 A1      Mar. 1, 2007

(30) Foreign Application Priority Data

Aug. 31, 2005     (JP)     ............... 2005-252650

(51) Int. Cl.
  *G11B 7/00*     (2006.01)
(52) U.S. Cl. .................. 250/201.5; 369/44.41
(58) Field of Classification Search ............ 250/201.5, 250/201.2, 201.4; 369/44.14, 44.27, 44.41, 369/120

See application file for complete search history.

(56) References Cited

U.S. PATENT DOCUMENTS 6,480,456 B1 *   11/2002   Kawamura et al. ........ 369/120
7,180,838 B2 *    2/2007   Park et al. ................ 369/44.41
7,369,466 B2 *    5/2008   Heor ........................ 369/44.37

FOREIGN PATENT DOCUMENTS

JP     11-353666      12/1999

* cited by examiner

*Primary Examiner*—Kevin Pyo
(74) *Attorney, Agent, or Firm*—Oblon, Spivak, McClelland, Maier & Neustadt, P.C.

(57) ABSTRACT

An optical pickup for recording or reproducing information to an optical disk, includes: a first photodetector for detecting a return light from the optical disk, wherein the first photodetector is configured so that the first photodetector is divided into three portions in a radial direction corresponding to a radial direction of the optical disk and light receiving elements at both end portions in the radial direction are divided into three portions in substantially a track direction perpendicular to the radial direction, so that the first photodetector includes a light receiving element at a central portion in the radial direction and the three light receiving portions at each of both the end portions to be seven in total to output a light receiving element signal based on light reception of the return light as a track error signal generation signal.

18 Claims, 16 Drawing Sheets

OPTICAL PICKUP, INFORMATION PROCESSING APPARATUS AND SIGNAL PROCESSING METHOD

BACKGROUND OF THE INVENTION

1. Field of the Invention

The present invention relates to an optical pickup, an information processing apparatus and a signal processing method, and more particular to an optical pickup, an information processing apparatus and a signal processing method, each enabling accurate execution of the detection of a track error signal and a focus error signal.

2. Description of the Related Art

Recently, many optical disks (including magneto-optical disks) have been used as recording and reproducing media of digital data. The optical disks are, for example, a compact disk (CD), a mini disk (MD), a digital versatile disk (DVD) and the like.

In data recording and reproducing in which such an optical disk is applied, the positional control of an optical pickup becomes necessary, and the detection of a return light from a disk read by the optical pickup is performed, for example, for tracking servo and focus servo. For example, the light spot detection of the return light from the disk is performed with a photodetector composed of divided light receiving elements.

As related art disclosing a signal detection configuration for servo, for example, there is Japanese Patent Application Publication No. Hei 11-353666. Japanese Patent Application Publication No. Hei 11-353666 discloses a photodetector configuration divided into three portions of the central portion and both end portions in the direction perpendicular to a radial direction corresponding to a radial direction of a disk to detect a radial error signal.

However, the configuration shown in Japanese Patent Application Publication No. Hei 11-353666 has only a track error signal as the signal acquired by the radial error signal, and must configure another photo-detection system including a photodetector and an optical system for the detection of a focus error. Consequently, the configuration has a problem in which the apparatus configuration becomes complicated and larger in size. Furthermore, there is another problem of the impossibility of the correction of an offset of the DC level of a track error signal to a lens shift when a beam size and a shape on a light receiving portion change owing to a focus shift, aberration and the like in the case of the detection of the track error signal pursuant to the system.

SUMMARY OF THE INVENTION

The present invention was made in consideration of the above-described situation. In the situation, there is a need for an optical pickup, an information processing apparatus and a signal processing method, each realizing the detection of a track error signal and a focus error signal with a small and simple configuration.

Furthermore, minutely, as a simple and small configuration, the present invention realizes a configuration of a photo-detection system enabling the detection of a focus error, the detection of a track error and the detection of an RF signal by the same photo-detection system to make it possible to detect almost all signals necessary for driving an optical disk apparatus by the same photo-detection system by using a first photodetector including light receiving portions divided into three portions in a radial direction corresponding to a radial direction of a disk, the light receiving portions at both ends of the three portions further divided into three portions in a track direction perpendicular to the radial direction, and a second photodetector having the light receiving portions divided into three portions in a radial direction. Furthermore, the present invention provides an optical pickup, an information processing apparatus and a signal processing method, each enabling the detection of a track error signal difficult to influence even when a beam size and a beam shape on a light receiving portion has changed owing to a primary factor such as a focus shift.

A first aspect of the present invention is an optical pickup to be applied to recording or reproducing information to an optical disk, the optical pickup having a configuration of including a first photodetector for detecting a return light from the optical disk, wherein the first photodetector is configured so that the first photodetector is divided into three portions in a radial direction corresponding to a radial direction of the optical disk and light receiving elements at both end portions in the radial direction are divided into three portions in substantially a track direction perpendicular to the radial direction, so that the first photodetector includes a light receiving element at a central portion in the radial direction and the three light receiving portions at each of both the end portions to be seven in total to output a light receiving element signal based on light reception of the return light as a track error signal generation signal.

Moreover, in an embodiment of the optical pickup of the present invention, the optical pickup further includes a second photodetector, wherein the first photodetector is disposed at a position shifted from a focus position of the return light from the optical disk by a distance L, and the second photodetector is disposed at a position shifted from a focus position of the return light from the optical disk by the distance L in a reverse direction to a direction of the first photodetector, and the second photodetector has three light receiving elements divided into three portions in a radial direction corresponding to a radial direction of the optical disk, and each of light receiving element signals of the first photodetector and the second photodetector are output as the track error signal generation signal and a focus error signal generation signal, respectively.

Moreover, a second aspect of the present invention is an information processing apparatus executing information recording processing or information reproducing processing in each of which an optical disk is applied, the apparatus including an optical pickup radiating a light to the optical disk and executing detection processing of a return light from the optical disk, and a signal processing unit generating a control signal based on detection light of the optical pickup, wherein the optical pickup includes a first photodetector for detecting the return light from the pickup, wherein the first photodetector is configured so that the first photodetector is divided into three portions in a radial direction corresponding to a radial direction of the optical disk and light receiving elements at both end portions in the radial direction are divided into three portions in substantially a track direction perpendicular to the radial direction, so that the first photodetector includes a light receiving element at a central portion in the radial direction and the three light receiving portions at each of both the end portions to be seven in total to output a light receiving element signal based on light reception of the return light as a track error signal generation signal, wherein the signal processing unit is configured to receive an input of a light receiving element signal from the optical pickup to generate the track error signal.

Moreover, in an embodiment of the optical pickup of the present invention, the optical pickup further includes a second photodetector, wherein the first photodetector is disposed at a position shifted from a focus position of the return light from the optical disk by a distance L, and the second photodetector is disposed at a position shifted from a focus position of the return light from the optical disk by the distance L in a reverse direction to a direction of the first photodetector, the second photodetector is configured to have three light receiving elements divided into three portions in a radial direction corresponding to a radial direction of the optical disk to output each of light receiving element signals of the first photodetector and the second photodetector as the track error signal generation signal and a focus error signal generation signal, and the signal processing unit is configured to generate the track error signal and the focus error signal based on each of the light receiving element signals of the first photodetector and the second photodetector, respectively.

Furthermore, in an embodiment of the information processing apparatus of the present invention, the signal processing unit is configured to execute processing of generating the track error signal Tr in accordance with a following formula, Tr=(A−D)−ma{(B1+B2)−(C1+C2)), where ma is a correction coefficient, based on a difference signal (A−D) of signals from two light receiving elements at a center of three divided light receiving elements in substantially the track direction, which elements exist in each of both the end portions in the radial direction corresponding to the radial direction of the optical disk, and a difference signal, (B1+B2)−(C1+C2), of sum signals (B1+B2) and (C1+C2) of two light receiving elements at end portions in the track direction among three divided light receiving elements substantially in the track direction in each of the end portions in the radial direction among light receiving element signals input from the first photodetector.

Moreover, in one embodiment of the information processing apparatus of the present invention, the signal processing unit is configured so that the signal processing unit sets the correction coefficient ma based on a ratio of inclinations of DC offsets, according to lens shifts to the radial direction, of signal components (A−D) and {(B1+B2)−(C1+C2)} and the signal processing unit executes processing of generating the tack error signal Tr based on the calculation formula Tr=(A−D)−ma{(B1+B2)−(C1+C2)}.

Furthermore, in an embodiment of the information processing apparatus of the present invention, the signal processing unit is configured to execute processing of generating the track error signal Tr in accordance with a following formula, Tr=(A−D)−{ma/(B1+B2+C1+C2+mbI)}{(B1+B2)−(C1+C2)}, where ma and mb are correction coefficients, based on a signal I of a light receiving element located at a center of the radial direction corresponding to the radial direction of the optical disk, a difference signal (A−D) of signals from two light receiving elements at a center of the three divided light receiving elements in substantially the track direction, which elements exist in each of both the end portions in the radial direction corresponding to the radial direction of the optical disk, and a difference signal, {(B1+B2)−(C1+C2)} of sum signals (B1+B2) and (C1+C2) of two light receiving elements at end portions in the track direction among three divided light receiving elements substantially in the track direction in each of the end portions in the radial direction among light receiving element signals input from the first photodetector.

Furthermore, in one embodiment of the information processing apparatus of the present invention, the signal processing unit is configured so that the signal processing unit sets the correction coefficient ma based on a ratio of inclinations of DC offsets, according to lens shifts to the radial direction, of signal components (A−D) and {(B1+B2)−(C1+C2)} and sets the correction coefficient mb in order that a value (B1+B2+C1+C2+mbI) acquired by adding a signal component (B1+B2+C1+C2) and a multiplication value of the correction coefficient mb and a signal component I may be a value almost uniform to lens shifts, and so that the signal processing unit executes processing of generating the tack error signal Tr based on the calculation formula Tr=(A−D)−{ma/(B1+B2+C1+C2+mbI)}{(B1+B2)−(C1+C2)}.

Furthermore, in an embodiment of the information processing apparatus of the present invention, the signal processing unit is configured to execute processing of generating the track error signal Tr in accordance with a following formula, Tr=(A−D)−mc(E−H)−ma{(B1+B2)−(C1+C2)}, where ma and mc are correction coefficients, based on a difference signal (A−D) of signals from two light receiving elements at a center of three divided light receiving elements in substantially the track direction, which elements exist in each of both the end portions in the radial direction corresponding to the radial direction of the optical disk, and a difference signal {(B1+B2)−(C1+C2)} of sum signals (B1+B2) and (C1+C2) of two light receiving elements at end portions in the track direction among three divided light receiving elements substantially in the track direction in each of the end portions in the radial direction among light receiving element signals input from the first photodetector, and further a difference signal (E−H) of signals of two light receiving elements located at both end portions of the radial direction corresponding to the radial direction of the optical disk among the light receiving element signals input from the second photodetector.

Furthermore, in one embodiment of the information processing apparatus of the present invention, the signal processing unit is configured so that the signal processing unit sets the correction coefficient ma based on a ratio of inclinations of DC offsets, according to lens shifts to the radial direction, of signal components (A−D) and {(B1+B2)−(C1+C2)} and sets the correction coefficient mc in order that an error produced at a time of an occurrence of a focus shift of the signal component (A−D) may be canceled by a multiplication value of a signal component (E−H) and the correction coefficient mc, and so that the signal processing unit executes the processing of generating the tack error signal Tr based on the calculation formula Tr=(A−D)−mc(E−H)−ma{(B1+B2)−(C1+C2)}.

Furthermore, in an embodiment of the information processing apparatus of the present invention, the signal processing unit is configured to execute processing of generating the focus error signal Fo in accordance with a following formula, Fo=I−(A+D+B1+B2+C1+C2)+E+H, based on a difference signal {I−(A+D+B1+B2+C1+C2)} between a signal I of a light receiving element at a center in the radial direction corresponding to the radial direction of the optical disk and a total sum signal (A+D+B1+B2+C1+C2) of the three divided light receiving elements in substantially the track direction, which elements are located at each of both the end portions in the radial direction, among light receiving element signals input from the first photodetector, and a difference signal (E+H−J) of a signal J of a light receiving element located at a center in the radial direction corresponding to the radial direction of the optical disk and a total sum signal (E+H) of two light receiving elements located at both end portions in the radial direction corresponding to the radial direction of the optical disk among the light receiving element signals input from the second photodetector.

Moreover, a third aspect of the present invention is a signal processing method of generating a control signal of an optical pickup, including the steps of: inputting a light receiving element signal detected based on light reception of a return light from an optical disk in a first photodetector including light receiving elements divided into three portions in a radial direction corresponding to a radial direction of the optical disk, the light receiving elements located at both end portions in the radial direction divided into three portions in substantially a track direction perpendicular to the radial direction, the first photodetector including the light receiving element at a central portion in the radial direction and the three light receiving portions at each of both the end portions to be seven in total; and executing processing of generating a track error signal Tr in accordance with a following formula, Tr=(A−D)−ma{(B1+B2)−(C1+C2)}, where ma is a correction coefficient, based on a difference signal (A−D) of signals from two of the light receiving elements at the center of the three divided light receiving elements in substantially the track direction, which elements exist in each of both the end portions in the radial direction corresponding to the radial direction of the optical disk in the first photodetector, and a difference signal, (B1+B2)−(C1+C2), of sum signals (B1+B2) and (C1+C2) of two light receiving elements at end portions in the track direction among the three divided light receiving elements substantially in the track direction in each of the end portions in the radial direction.

Furthermore, in an embodiment of the signal processing method of the present invention, the track error signal generation step sets the correction coefficient ma based on a ratio of inclinations of DC offsets, according to lens shifts to the radial direction, of signal components (A−D) and {(B1+B2)−(C1+C2)}, and executes the processing of generating the tack error signal Tr based on the calculation formula Tr=(A−D)−ma{(B1+B2)−(C1+C2)}.

Moreover, a fourth aspect of the present invention is a signal processing method of generating a control signal of an optical pickup, including the steps of: inputting a light receiving element signal detected based on light reception of a return light from an optical disk in a first photodetector including light receiving elements divided into three portions in a radial direction corresponding to a radial direction of the optical disk, the light receiving elements located at both end portions in the radial direction divided into three portions in substantially a track direction perpendicular to the radial direction, the first photodetector including the light receiving element at a central portion in the radial direction and the three light receiving portions at each of both the end portions to be seven in total; and executing processing of generating a track error signal Tr in accordance with a following formula, Tr=(A−D)−{ma/(B1+B2+C1+C2+mbI)}{(B1+B2)−(C1+C2)}, where ma and mb are correction coefficients, based on a signal I of the light receiving element located at the center of the radial direction corresponding to the radial direction of the optical disk in the first photodetector, a difference signal (A−D) of signals from two of the light receiving elements at the center of the three divided light receiving elements in substantially the track direction, which elements exist in each of both the end portions in the radial direction corresponding to the radial direction of the optical disk, and a difference signal {(B1+B2)−(C1+C2)} of sum signals (B1+B2) and (C1+C2) of two of the light receiving elements at end portions in the track direction among the three divided light receiving elements substantially in the track direction in each of the end portions in the radial direction.

Furthermore, in an embodiment of the signal processing method of the present invention, the track error signal generation step sets the correction coefficient ma based on a ratio of inclinations of DC offsets, according to lens shifts to the radial direction, of signal components (A−D) and {(B1+B2)−(C1+C2)}, sets the correction coefficient mb in order that a value (B1+B2+C1+C2+mbI) acquired by adding a signal component (B1+B2+C1+C2) and a multiplication value of the correction coefficient mb and the signal component I may be a value almost uniform to the lens shifts, and executes the processing of generating the tack error signal Tr based on the calculation formula Tr=(A−D)−{ma/(B1+B2+C1+C2+mbI)}{(B1+B2)−(C1+C2)}.

Moreover, a fifth aspect of the present invention is a signal processing method of generating a control signal of an optical pickup, including the steps of: inputting a light receiving element signal detected based on light reception of a return light from an optical disk in a first photodetector disposed at a position shifted from a focus position of the return light from the optical disk by a distance L, the first photodetector including light receiving elements divided into three portions in a radial direction corresponding to a radial direction of the optical disk, the light receiving elements located at both end portions in the radial direction divided into three portions in substantially a track direction perpendicular to the radial direction, the first photodetector including the light receiving element at a central portion in the radial direction and the three light receiving portions at each of both the end portions to be seven in total; inputting a light receiving element signal detected based on light reception of the return light from the optical disk in a second photodetector disposed at a position shifted from a focus position of the return light from the optical disk by the distance L in a reverse direction to a direction of the first photodetector, the second photodetector having three light receiving elements divided into three portions in a radial direction corresponding to a radial direction of the optical disk, and executing processing of generating a track error signal Tr in accordance with a following formula, Tr=(A−D)−mc(E−H)−ma{(B1+B2)−(C1+C2)}, where ma and mc are correction coefficients, based on a difference signal (A−D) of signals from two of the light receiving elements at a center of the three divided light receiving elements in substantially the track direction, which elements exist in each of both the end portions in the radial direction corresponding to the radial direction of the optical disk in the first photodetector, a difference signal {(B1+B2)−(C1+C2)} of sum signals (B1+B2) and (C1+C2) of two of the light receiving elements at end portions in the track direction among the three divided light receiving elements substantially in the track direction in each of the end portions in the radial direction, and a difference signal (E−H) of signals of two of the light receiving elements located at both end portions of the radial direction corresponding to the radial direction of the optical disk among light receiving element signals input from the second photodetector.

Furthermore, in an embodiment of the signal processing method of the present invention, the track error signal generation step sets the correction coefficient ma based on a ratio of inclinations of DC offsets, according to lens shifts to the radial direction, of signal components (A−D) and {(B1+B2)−(C1+C2)}, sets the correction coefficient mc in order that an error produced at a time of an occurrence of a focus shift of the signal component (A−D) may be canceled by a multiplication value of a signal component (E−H) and the correction coefficient mc, and executes the processing of generating the tack error signal Tr based on the calculation formula Tr=(A−D)−mc(E−H)−ma{(B1+B2)−(C1+C2)}.

Moreover, a sixth aspect of the present invention is a signal processing method of generating a control signal of an optical pickup, including the steps of: inputting a light receiving element signal detected based on light reception of a return light from an optical disk in a first photodetector disposed at a position shifted from a focus position of the return light from the optical disk by a distance L, the firs photodetector including light receiving elements divided into three portions in a radial direction corresponding to a radial direction of the optical disk, the light receiving elements located at both end portions in the radial direction divided into three portions in substantially a track direction perpendicular to the radial direction, the first photodetector including the light receiving element at a central portion in the radial direction and the three light receiving portions at each of both the end portions to be seven in total; inputting a light receiving element signal detected based on light reception of the return light from the optical disk in a second photodetector disposed at a position shifted from a focus position of the return light from the optical disk by the distance L in a reverse direction to a direction of the first photodetector, the second photodetector having three light receiving elements divided into three portions in a radial direction corresponding to a radial direction of the optical disk, and executing processing of generating a focus error signal Fo in accordance with a following formula, Fo={I−(A+D+B1+B2+C1+C2)+(E+H)−J}, based on a difference signal {I−(A+D+B1+B2+C1+C2)} between a signal I of the light receiving element at a center in the radial direction corresponding to the radial direction of the optical disk in the first photodetector and a total sum signal (A+D+B1+B2+C1+C2) of the three divided light receiving elements in substantially the track direction, which elements are located at each of both the end portions in the radial direction, and a difference signal (E+H−J) of a signal J of the light receiving element located at a center in the radial direction corresponding to the radial direction of the optical disk and a total sum signal (E+H) of two of the light receiving elements located at both end portions in the radial direction corresponding to the radial direction of the optical disk among the light receiving element signals input from the second photodetector.

The further objects, features and advantages of the present invention will be clarified by a more detailed description based on the embodiments of the present invention described later and the attached drawings.

The configuration of one embodiment of the present invention is as follows. That is, a first photodetector is divided into three portions in a radial direction corresponding to a radial direction of a disk and further the light receiving portions located at both the ends of the three divided portions are severally divided into three portions in a tracking direction perpendicular to the radial direction, and a second photodetector is divided to three portion in a radial direction. The first and the second photodetectors are applied to generate a track error signal and a focus error signal. In the generation of the track error signal, input signals from the first photodetector is mainly applied, and it is possible to generate a stable and accurate track error signal having no offsets in DC level. Moreover, by a configuration of performing a correction dealing with focus shifts, it is possible to generate the stable and accurate track error signal even if a focus shift occurs, and accurate control is enabled.

BRIEF DESCRIPTION OF THE DRAWINGS

The present invention will become more readily appreciated and understood from the following detailed description of embodiments and examples of the present invention when taken in conjunction with the accompanying drawings, in which.

DETAILED DESCRIPTION OF PREFERRED EMBODIMENTS

Figure 1:
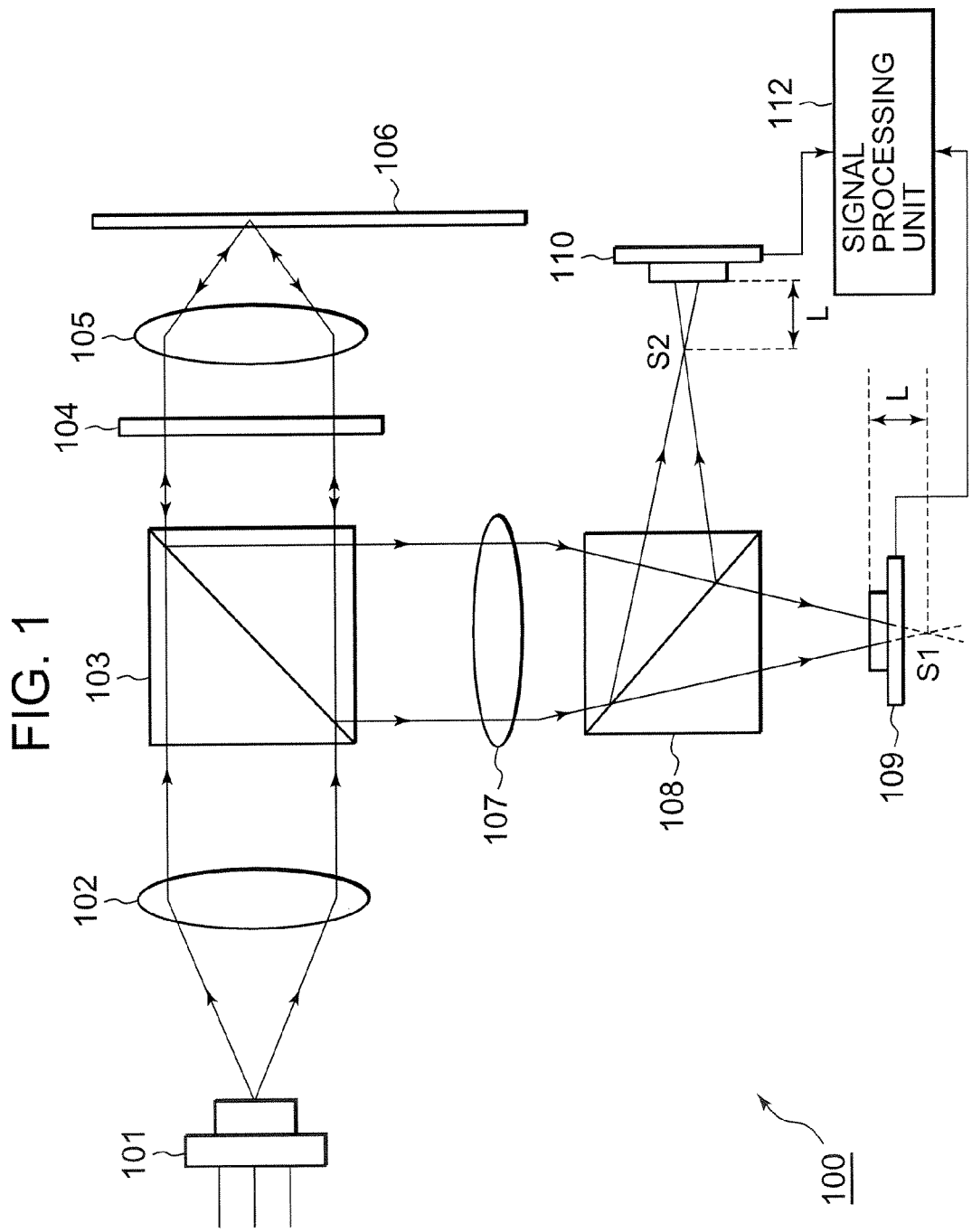
FIG. 1 is a diagram showing the configuration of an optical pickup of a first embodiment of the present invention.

In the following, an optical pickup, an information processing apparatus and a signal processing method of the present invention will be minutely described, referring to the drawings.

First Embodiment

FIG. 1 shows the configuration of an optical pickup of an information processing apparatus according to a first embodiment of the present invention. As shown in FIG. 1, the optical pickup 100 includes a semiconductor laser 101 as a laser light source, and a collimator lens 102 and a polarization beam splitter (PBS) 103 are provided on the optical path of the output light from the semiconductor laser 101 in the order. Furthermore, a quarter wavelength plate 104 and an objective lens 105 are provided on the optical path on the light transmission side of the polarization beam splitter (PBS) 103 in the order.

An optical disk 106 is located on the laser light output side of the objective lens 105. On the other hand, a condenser lens 107, a half mirror 108 and two photodetectors PD1 109 and PD2 110 that detect the return lights separated by the half mirror 108 are provided on the optical path on the return light side in the return path of the polarization beam splitter (PBS) 103. Detection signals of the two photodetectors PD1 109 and PD2 110 are input into a signal processing unit 112, and a track error signal Tr and a focus error signal Fo are generated to be output to a not shown servo control system. Then, a tracking servo and a focus servo are executed by a pickup, a lens drive or the like. In addition, the signal processing unit 112 may be configured to be inside or outside the pickup.

Figure 2:
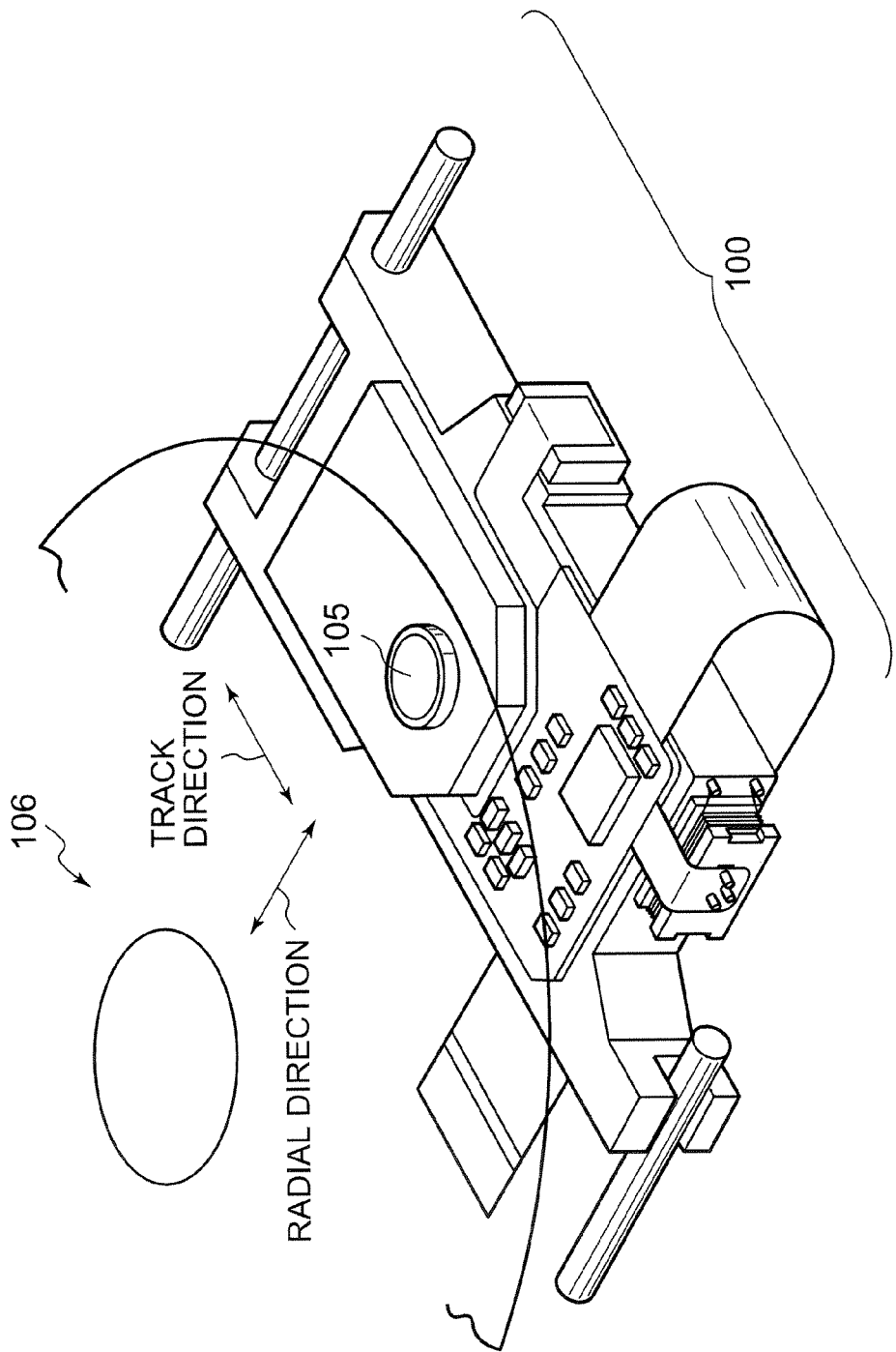
FIG. 2 is a view illustrating a correspondence relation between the optical pickup of the first embodiment of the present invention and a disk.

In addition, the concrete apparatus configuration of the optical pickup 100 has, for example as shown in FIG. 2, a configuration in which the optical pickup 100 is set at a position opposed to a surface of the optical disk in the state of being able to drive the optical disk 106, and in which the objective lens 105 is set at a position opposed to the surface of the optical disk. The whole optical pickup 100 can move in a radial direction which is a radial direction of the disk 106 by a drive system of the whole optical pickup 100, and the objective lens 105 undergoes minute position control by a servomechanism provided in the inside of the optical pickup 100. Thus, the tack servo and the focus servo are performed.

Returning to FIG. 1, the configuration of the acquirement of a tracking error signal and a focus error signal by the optical pickup 100 will be described. As shown in FIG. 1, the light emitted from the semiconductor laser 101 is collimated (made to be a parallel light) by the collimator lens 102, and enters the polarization beam splitter (PBS) 103. The polarization beam splitter (PBS) 103 has a polarizing film. The entered light beam passes through the polarization beam splitter (PBS) 103, and then is converted into a circularly polarized light by the quarter wavelength plate 104 to be condensed on the optical disk 106 by the objective lens 105.

The light reflected by the optical disk 106 transmits the objective lens 105 and the quarter wavelength plate 104, and is converted into a linearly polarized light perpendicular to an approach route polarized light. Then, the converted light is reflected by the polarization beam splitter (PBS) 103. The light reflected by the polarization beam splitter (PBS) 103 is condensed by the condenser lens 107, and is separated into two parts by the half mirror 108. After that, one of the separated light is received by the photodetector PD1 109 at a position near to the half mirror 108 from a condensing point SI of the separated light by a distance L, and the other light is received by the photodetector PD2 110 at a position farther than a condensing point S2 from the half mirror 108 by the distance L.

The configurations of the photodetectors PD1 109 and PD2 110 are described with reference to FIG. 3. Each of the photodetectors PD1 109 and PD2 110 are divided into three portions in a radial direction (a radial direction of the disk) in a symmetry pattern to the center line as shown in FIG. 3.

Figure 3:
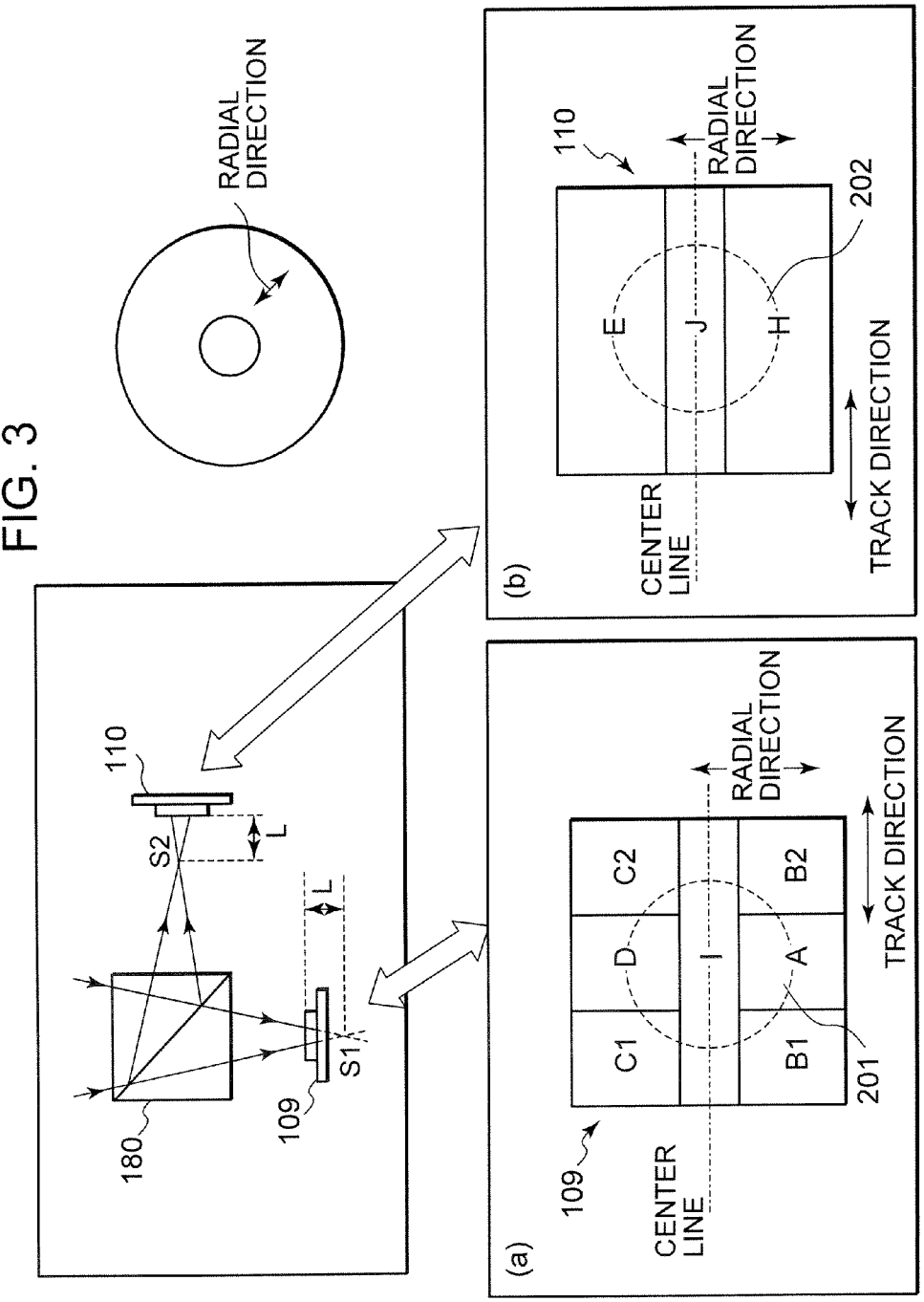
FIG. 3 is a diagram illustrating the configurations of photodetectors of the optical pickup of the first embodiment of the present invention.

As shown in a part (a) of FIG. 3, the photodetector PD1 109 is divided into three portions in a radial direction (the radial direction of the disk) in a symmetry pattern to the center line, and each of the light receiving portions on both the ends in the radial direction other than a central portion I is divided into three portions (B1, A, B2) and (C1, D, C2) in the direction perpendicular to the radial direction, i.e. a track direction.

Thus, the photodetector PD1 109 is composed of seven divided light receiving elements (A, B1, B2, C1, C2, D, I) in total.

Moreover, as shown in a part (b) of FIG. 3, the photodetector PD2 110 is divided into three portions in a radial direction (a radial direction of the disk) in a symmetry pattern to a center line to be composed of three divided light receiving elements (E, H, J) in total.

The photodetector PD1 109 receives a light spot 201 at a position near to the half mirror 108 from the condensing point S1 of light by the distance L, and the photodetector PD2 110 receives a light spot 202 at a position far from the condensing point S2 of light by the distance L.

In the signal processing unit 112 shown in FIG. 1, light receiving element signals that the photodetectors PD1 109 and PD2 110 detect are input, and the focus error signal Fo is calculated by the spot size method. That is, the focus error signal Fo is acquired by the operation of:

$$Fo = I - (A+D+B1+B2+C1+C2) + E + H - J.$$

In addition, each of the letters A–J is supposed to denote a light receiving element signal as an individual output value acquired based on the received light quantity of an optical spot in each of the light receiving elements A-J.

The signal {I−(A+D+B1+B2+C1+C2)} in the first half in the focus error signal Fo: Fo=I−(A+D+B1+B2+C1+C2)+E+H−J is a difference of the total (A+D+B1+B2+C1+C2) of the signals of the light receiving elements at both the ends in the radial direction from the light receiving element signal I at the center of the light receiving element divided into three portions in the radial direction (the radial direction of the disk) of the photodetector PD1 109.

On the other hand, the signal (E+H−J) in the latter half in the focus error signal Fo: Fo=I−(A+D+B1+B2+C1+C2)+E+H−J is a difference between the total (E+H) of the signal of the light receiving elements on both the ends of three divided portions in the radial direction (the radial direction of the disk) of the photodetector PD2 110 and the light receiving element signal J at the center.

As mentioned above, the optical pickup configuration is one in which the light reflected on the polarization beam splitter (PBS) 103 is condensed by the condenser lens 107 and separated into two lights by the half mirror 108. After that, one of the separated lights is received by the photodetector PD1 109 at the position near to the half mirror 108 from the condensing point S1 of the light by the distance L, and the other of the separated lights is received by the photodetector PD2 110 at the position farther from the half mirror 108 than the condensing point S2 of the light by the distance L. In the case where no shifts exist in the focal points, the light spots of the photodetectors PD1 109 and PD2 110 become the same size, and the focus error signal Fo, i.e. Fo=I−(A+D+B1+B2+C1+C2)+E+H−J, shows a predetermined value. When a focus shift occurs, the signal value changes.

On the other hand, the signal processing unit 112 shown in FIG. 1 therein inputs a light receiving element signal detected by the photodetectors PD1 109 and PD2 110, and calculates the track error signal Tr in conformity with the following formula: Tr=(A−D)−ma{(B1+B2)−(C1+C2)}.

Here, the letters ma denotes a correction coefficient for correcting the influences of the track error signal by lens shifts.

The present embodiment is configured to calculate the track error signal Tr by using only the signals A, D, B1, B2, C1 and C2 of the photodetector PD1 109. That is, the present embodiment detects the track error signal Tr based on the signals of the six light receiving elements at both end portions of the photodetector PD1 109 in the radial direction. To put it concretely, the calculation formula of the track error signal Tr is:

$$Tr=(A-D)-ma\{(B1+B2)-(C1+C2)\}.$$

As it can be understood from the configuration of the photodetector PD1 109 shown in the part (a) of FIG. 3, the signal in the first half of the track error signal Tr, i.e. the signal (A−D), is equivalent to the difference between the signals A and D of the light receiving elements at the center of the track direction among the light receiving element signals (B1, A, B2) at one end in the radial direction and the light receiving element signals (C1, D, C2) at the other end in the radial direction.

Moreover, the signal of the latter half of the track error signal Tr, ma{(B1+B2)−(C1+C2)}, is equivalent to a value acquired by multiplying a difference of added values (B1+B2) and (C1+C2) of the signals from the light receiving elements at both the ends in the track direction among the light receiving element signals (B1, A, B2) at one end of the photodetector PD1 109 in the radial direction and the light receiving element signals (C1, D, C2) of the photodetector PD1 109 at the other end in the radial direction by the predetermined correction coefficient ma.

The case where the objective lens 105 of the optical pickup 100 is shifted in the radial direction as the radial direction of the disk is considered.

Figure 4:
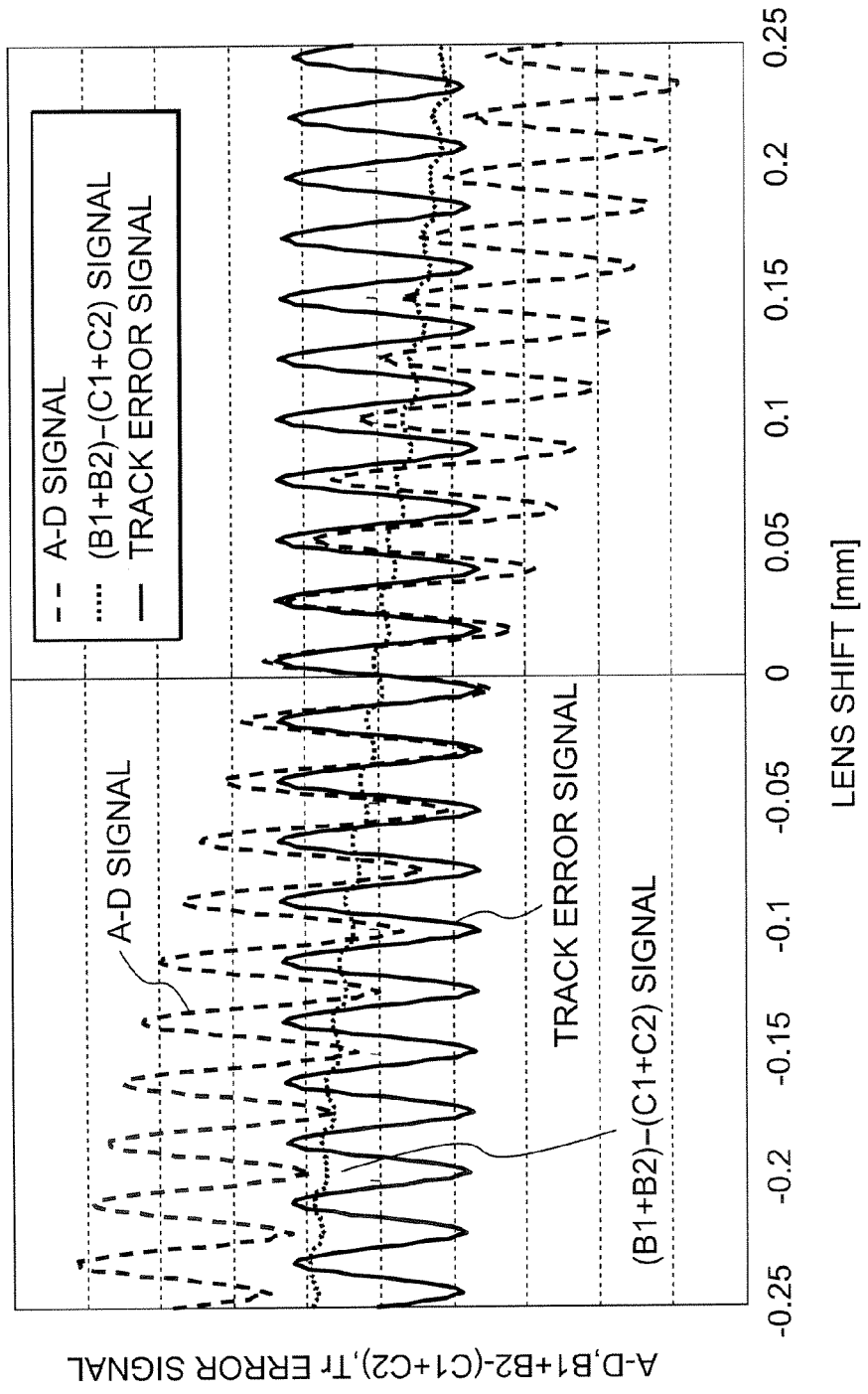
FIG. 4 is a diagram showing a graph illustrating changes of a track error signal and the element signals thereof to lens shifts.

FIG. 4 shows a graph showing the correspondence of the track error signal Tr, i.e. the track error signal Tr calculated in conformity with the formula: Tr=(A−D)−ma{(B1+B2)−(C1+C2)}, to shift quantities of the objective lens 105b of the optical pickup 100 in the radial direction as the radial direction of the disk, and the correspondence relations between each signal value of (A−D) and {(B1+B2)−(C1+C2)} as the components of the formula.

In the graph shown in FIG. 4, changes of each signal are shown within a range of the lens shifts from −0.25 mm to +0.25 mm around 0 as the central portion. The objective lens 105 of the pickup 100 at the position of the lens shift 0 at the central position is in the sate of being disposed at the correction track position of the disk. The graph shown in FIG. 4 shows the changes of each signal in the case where the lens shifts of the objective lens 105 occur within the range of from −0.25 mm to +0.25 mm in the radial direction (the radial direction of the disk perpendicular to the track.

As shown in the graph of FIG. 4, as the lens shifts, the degree of the offset of the DC level of the A−D signal changes. That is, the A−D signal shown in the graph is a diagonally right down signal having a relatively large inclination. The A−D signal becomes large in the −0.25 direction of the lens shifts, and becomes small in the +0.25 direction. That is, the A−D signal has an offset in DC level as the relatively large diagonally right down direct-current component.

On the other hand, the degree of the offset of the DC level of the {(B1+B2)−(C1+C2)} signal has a different inclination from that of the A−D signal. That is, the {(B1+B2)−(C1+C2)} signal in the graph is a diagonally right down signal having a relatively small inclination. The {(B1+B2)−(C1+C2)} signal becomes larger in the −0.25 direction, and becomes smaller in the +0.25 direction. That is, the {(B1+B2)−(C1+C2)} signal has the offset of the DC level thereof as a diagonally right down direct-current component having a relatively small inclination different from that of the A−D signal.

As described above, the track error signal Tr is expressed as Tr=(A−D)−ma{(B1+B2)−(C1+C2)}.

The coefficient ma, which is set in the track error signal Tr calculation formula, is set to be a ratio between the inclination of the DC offset of the A−D signal, which can be calculated from the graph shown in FIG. 4, and the inclination of the DC offset of the {(B1+B2)−(C1+C2)} signal.

When the track error signal Tr is calculated based on the setting of the coefficient, only the pure track error signals which does not included any offsets of the DC level thereof can be acquired even when some lens shifts occur.

Figure 5:
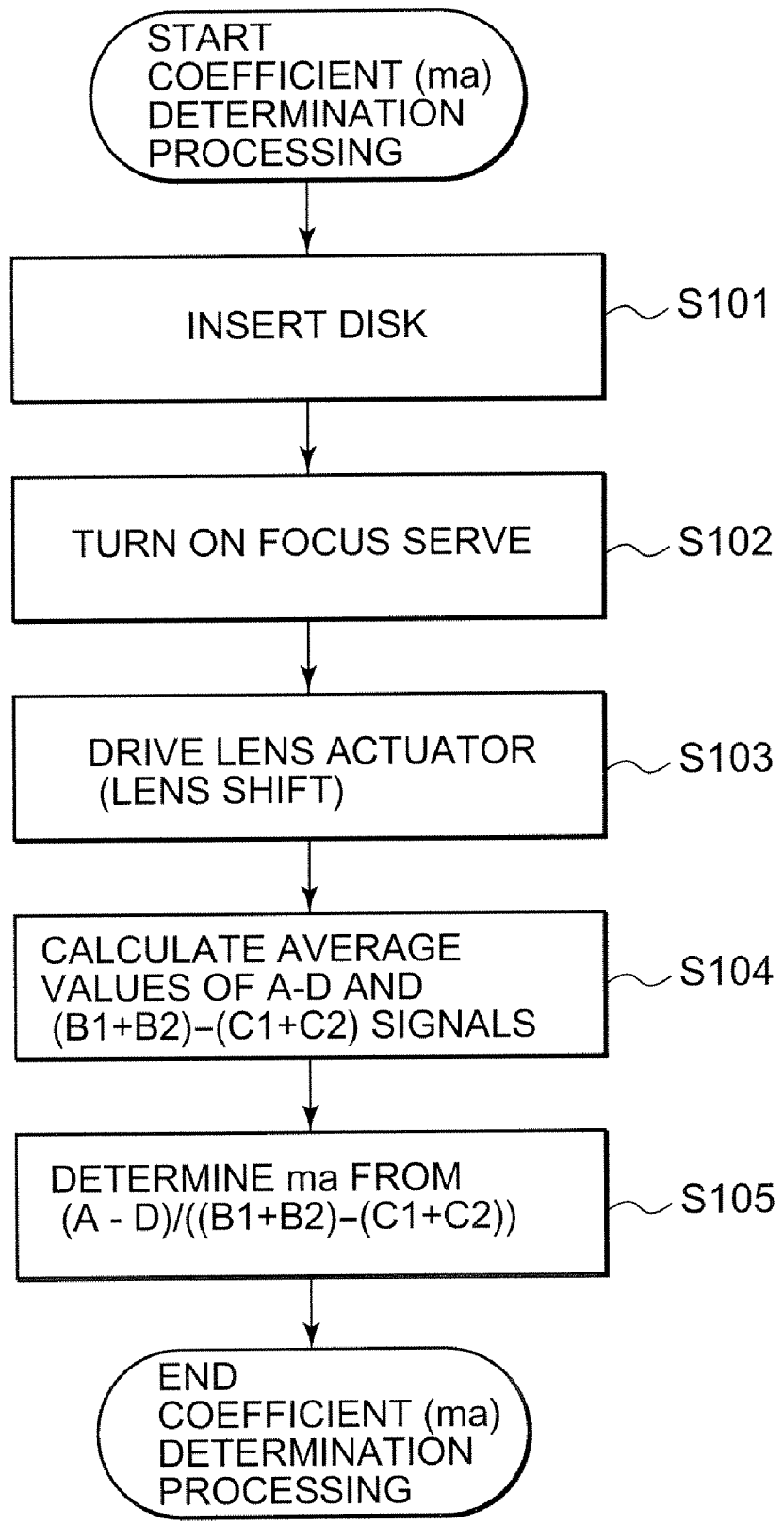
FIG. 5 is a diagram showing a flowchart illustrating a processing sequence of calculating a correction coefficient ma in a calculation formula of a track error signal Tr.

The calculation processing sequence of the coefficient ma in the track error signal Tr calculation formula, namely Tr=(A−D)−ma{(B1+B2)−(C1+C2)}, is described referring to FIG. 5.

The track error signal can be acquired in conformity with Tr=(A−D)−ma{(B1+B2)−(C1+C2)}. Here, the coefficient ma is a correction coefficient to correct the influences of the track error signal Tr by the DC level offsets based on the lens shifts. Each processing step executed in the determination processing sequence of the correction coefficient ma of FIG. 5 is described.

First, a Step S101, when an optical disk is inserted in a drive, focus servo is turned on at Step S102. Next, at Step S103, a DC drive current is flowed in an object lens actuator, and a fixed amount of lens shift is performed. This is the processing of shifting the objective lens 105 of the pickup 100 shown in FIG. 2 in a radial direction of the disk 106 by a fixed distance. The shift distance may be set to an arbitrarily predetermined distance.

At Step S104, a ratio between an average value ave(A−D) of the A−D signal and an average value ave{(B1+B2)−(C1+C2)} of the {(B1+B2)−(C1+C2)} signal, namely ave(A−D)/ave{(B1+B2)−(C1+C2)}, at the time of the execution of the shift processing of the fixed distance is calculated, and at Step S105, the correction coefficient ma is set as ma=ave(A−D)/ave{(B1+B2)−(C1+C2)}.

A concrete processing example of each step executing the calculation processing flow of the correction coefficient ma in FIG. 5 is described with reference to FIGS. 6 and 7. At Step S103 of FIG. 5, the DC drive current is flowed in the objective lens actuator to perform the fixed amount of lens shift. This performs the fixed distance shift of the objective lens 105 of the pickup 100 in the radial direction of the disk 106, and at Step S104, executes the processing of calculating a ratio between an average value ave(A−D) of the A−D signal and an average value ave{(B1+B2)−(C1+C2)}, i.e. ave(A−D)/ave{(B1+B2)−(C1+C2)}, at the time of the execution of the shift processing of the fixed distance.

The processing is described. Similarly to FIG. 4 mentioned above, the graph shown in FIG. 6 is a graph showing the correspondence relation between the shift quantities of the objective lens 105 of the optical pickup 100, the track error signal Tr, i.e. Tr=(A−D)−ma{(B1+B2)−(C1+C2)}, and each of the signal values of (A−D) and {(B1+B2)−(C1+C2)} as the components of the formula mentioned above.

Figure 6:
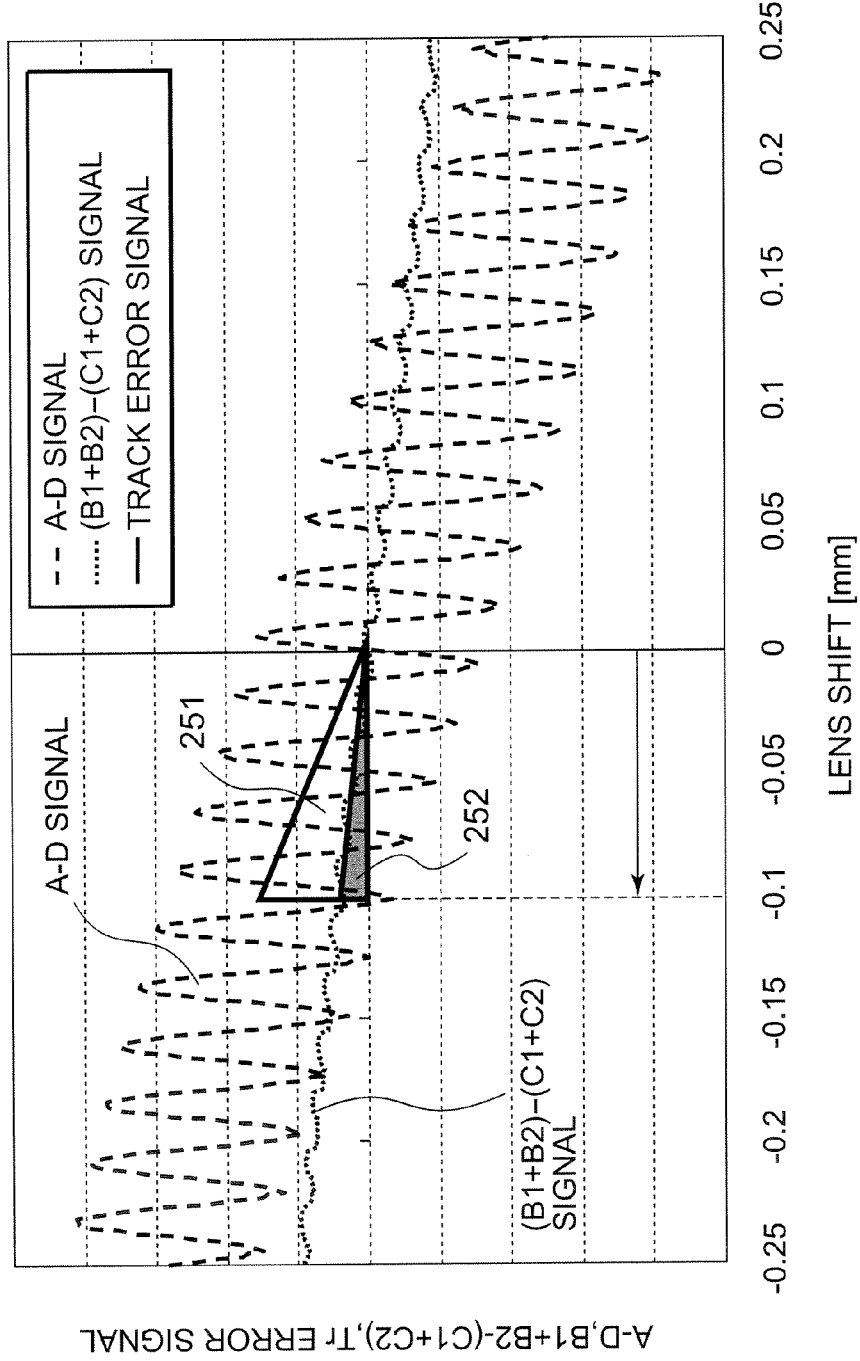
FIG. 6 is a diagram illustrating a concrete processing example of calculating the correction coefficient ma in the calculation formula of the track error signal Tr.

It is supposed that the fixed amount of lens shift is executed to −0.1 in the left direction in the graph shown in FIG. 6. After the lens shift processing, at Step S104, a ratio of the average value ave(A−D) of the A−D signal and the average value ave{(B1+B2)−(C1+C2)} of the {B1+B2−(C1+C2)} signal, namely ave(A−D)/ave{(B1+B2)−(C1+C2)}, at the time of the execution of the shift processing of the constant distance is calculated.

The average value ave(A−D) of the A−D signal is equivalent to the height of a triangle 251 shown in FIG. 6, and the average value ave{(B1+B2)−(C1+C2)} of the {(B1+B2)−(C1+C2)} signal is equivalent to the height of a triangle 252 shown in FIG. 6.

Figure 7:
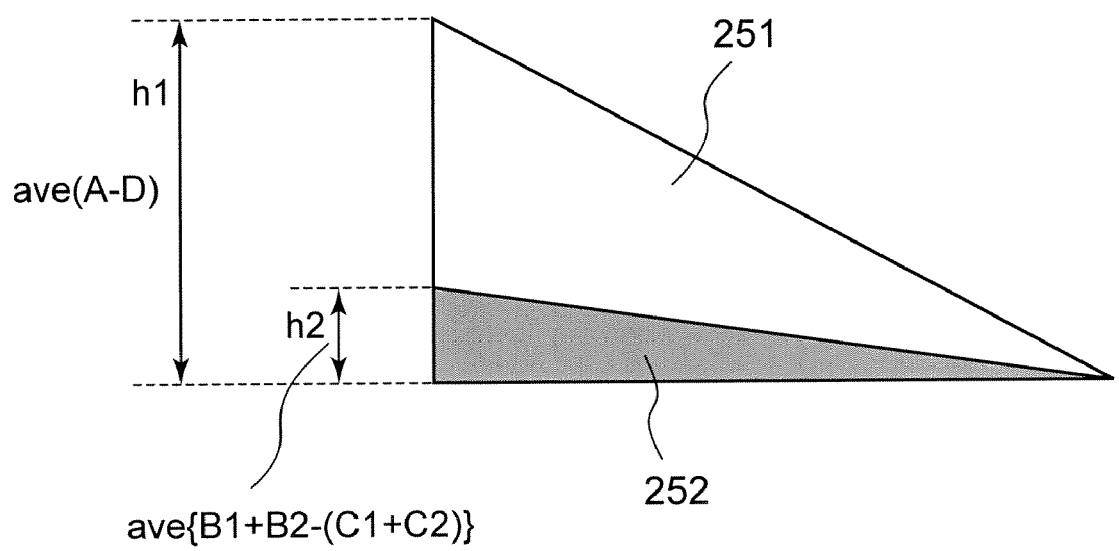
FIG. 7 is a diagram illustrating a concrete processing example of calculating the correction coefficient ma in the calculation formula of the track error signal Tr.

FIG. 7 shows extracted figures of these triangles. A height h1 of the triangle 251 shown in FIG. 7 is equivalent to the average value ave(A−D) of the A−D signal in the case of executing the lens shift to left −0.1 in the left direction in the graph shown in FIG. 6. Moreover, the height h2 of the triangle 252 shown in FIG. 7 is equivalent to the average value ave{(B1+B2)−(C1+C2)} of the {(B1+B2)−(C1+C2)} signal at the time of executing the lens shift to −0.1 in the left direction in the graph shown in FIG. 6.

Thus, each average value is equivalent to the inclination of the DC level of each signal. At Step S104, the ratio h1/h2 of the inclinations of the two signals is calculated as ave(A−D)/ave{(B1+B2)−(C1+C2)}, and the processing of setting the correction coefficient ma as ave(A−D)/ma=ave{(B1+B2)−(C1+C2)} is executed at Step S105.

By performing such the setting of the correction coefficient ma, the calculated track error signal Tr having no offsets of the DC level can be acquired even if lens shifts are caused when the track error signal Tr calculation formula Tr=(A−D)−ma{(B1+B2)−(C1+C2)} is applied to execute the operation.

Moreover, the following method may be employed as the configuration of determining the correction coefficient ma in order to heighten the accuracy more in the calculation processing of the correction coefficient ma. That is, there may be adopted the configuration of determining the m by calculating the difference between the average value of the A−D signal at the time of performing the fixed amount of lens shift by the same procedure as that of the example mentioned above and the average value of the A−D signal at the time of performing no lens shifts, and the difference between the average value of the {(B1+B2)−(C1+C2)} signal at the time of performing the fixed amount of the lens shift and the average value of the {(B1+B2)−(C1+C2)} signal at the time of performing no lens shifts.

Figure 8:
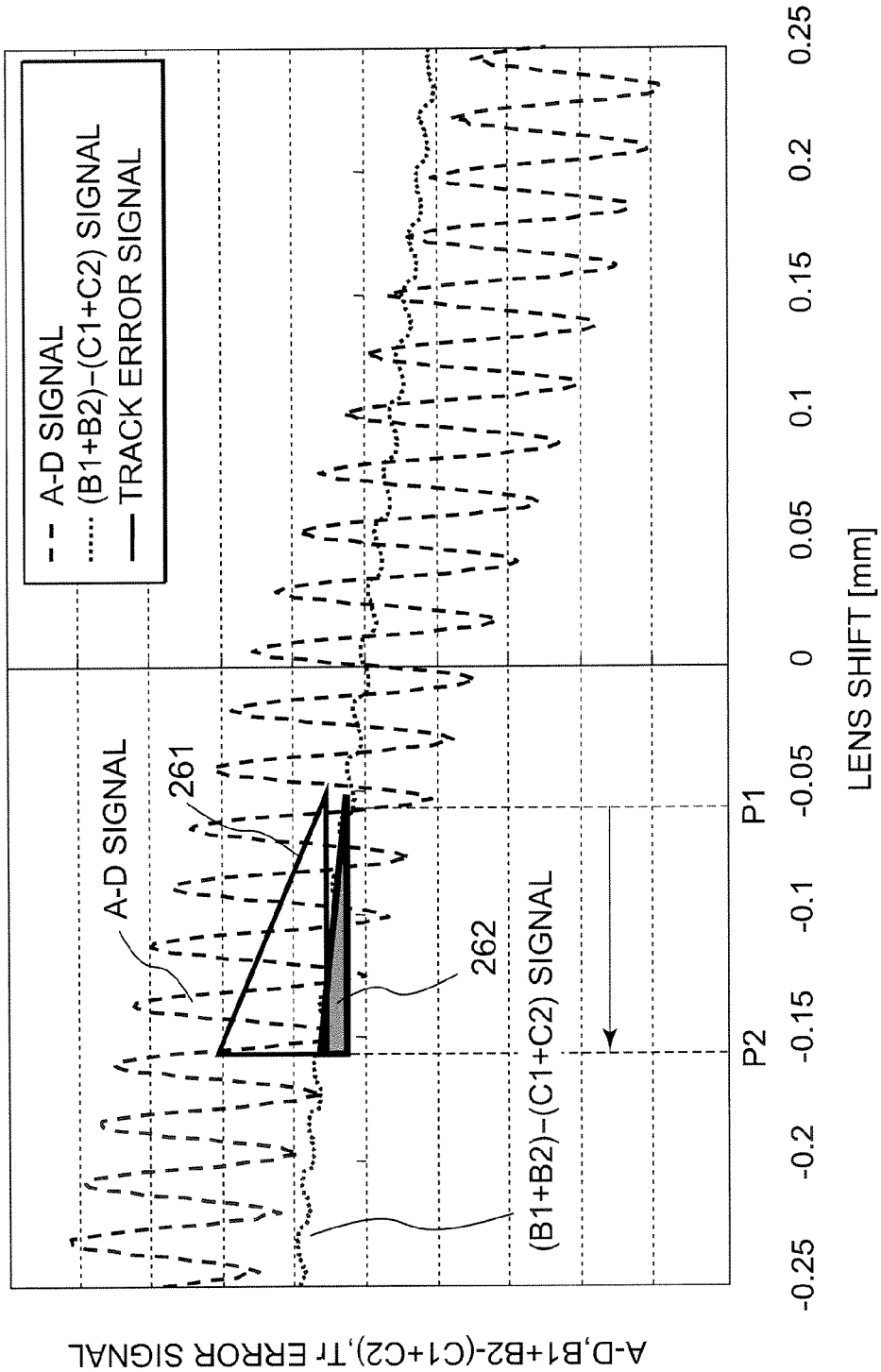
FIG. 8 is a diagram illustrating another concrete processing example of calculating the correction coefficient ma in the calculation formula of the track error signal Tr.

The processing is effective processing in the case where, for example, as shown in FIG. 8, a disk is not set an accurate track position at a point P1 where shift processing is started after having been installed in its drive and different DC level offsets have been already included in the A−D signal and the {(B1+B2)−(C1+C2)} signal. The shift starting point is supposed to be the point P1, and the shift ending point is supposed to be at point P2. At each of the points, the average value of each of the signals is acquired and the difference between them is calculated.

Figure 9:
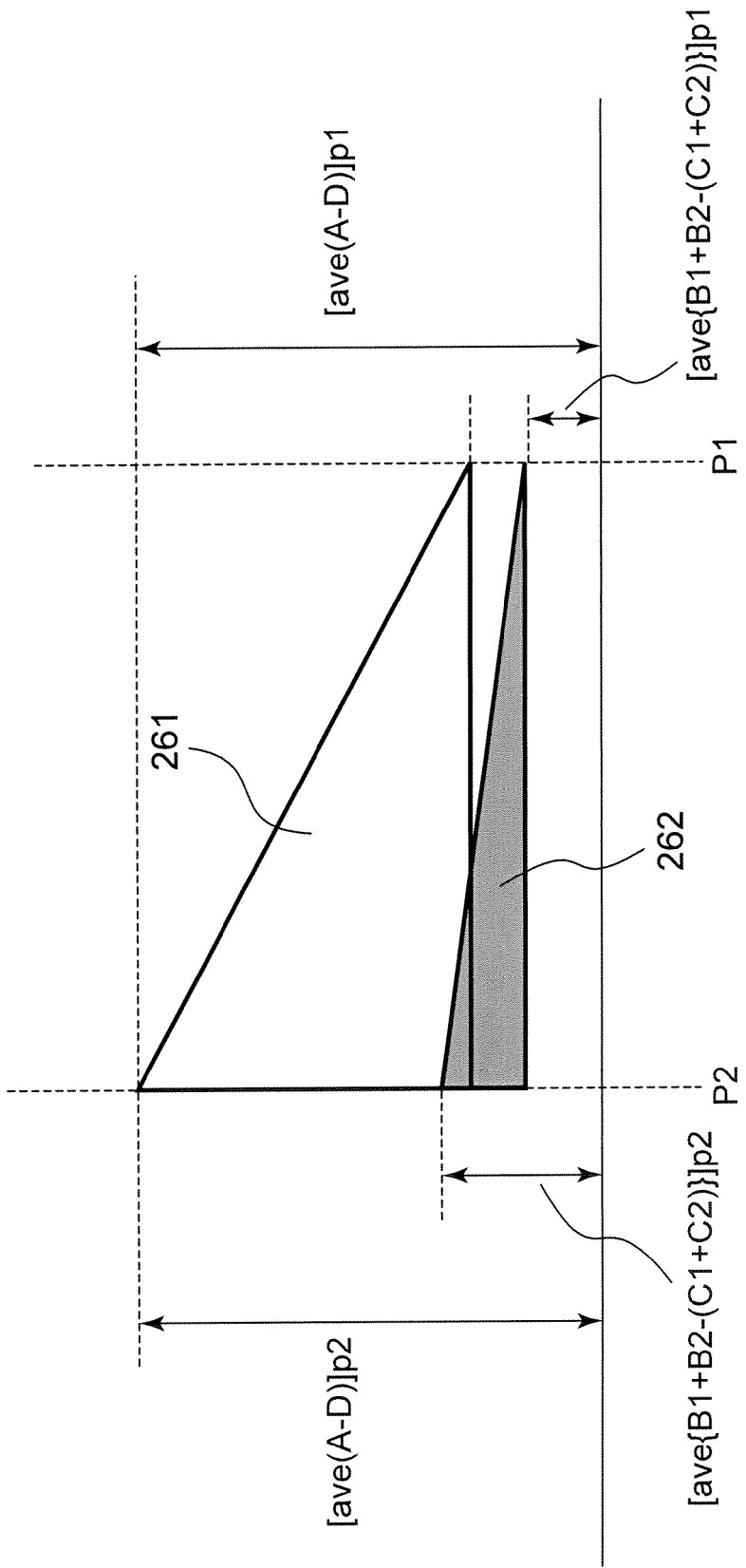
FIG. 9 is a diagram illustrating the concrete processing example of calculating the correction coefficient ma in the calculation formula of the track error signal Tr.

That is, as shown in FIG. 9, at the point P1, where the shift processing is started, an average value of the A−D signal {ave(A−D)}p1 and an average value ave{(B1+B2)−(C1+C2)}p2 of the {(B1+B2)−(C1+C2)} signal are calculated, and at the shift processing ending point P2, which is shifted by a predetermined distance, an average value {ave(A−D)}p2 of the A−D signal and an average value [ave{(B1+B2)−(C1+C2)}]p2 of the {(B1+B2)−(C1+C2)} signal are calculated.

After that, a ratio of the differences of the average values of each signal at the shift processing starting point P1 and the shift processing ending point P2 is calculated. That is, [{ave(A−D)}p2−{ave(A−D)}p1]/[ave{(B1+B2)−(C1+C2)}p2−ave{(B1+B2)−(C1+C2)}p1] is calculated, and the correction coefficient ma is set as ma=[{ave(A−D)}p2−{ave(A−D)}p1]/[ave{(B1+B2)−(C1+C2)}p2−ave{(B1+B2)−(C1+C2)}p1].

By the processing, for example, as shown in FIG. 8, an accurate ratio of the inclination of the DC level offset of each signal can be calculated even in the case where a disk is not set an accurate track position at a the point P1 where shift processing is started after having been installed in its drive and different DC level offsets have been already included in the A−D signal and the {(B1+B2)−(C1+C2)} signal, and then more accurate correction coefficient ma can be calculated.

By the calculation of the track error signal Tr applying thereto the following track error signal Tr calculation formula Tr=(A−D)−ma{(B1+B2)−(C1+C2)} in which the correction coefficient ma determined as above is set, a true track error signal having no offsets of its DC level can be calculated even if any lens shifts occur, and accurate track servo is realized.

Figure 13:
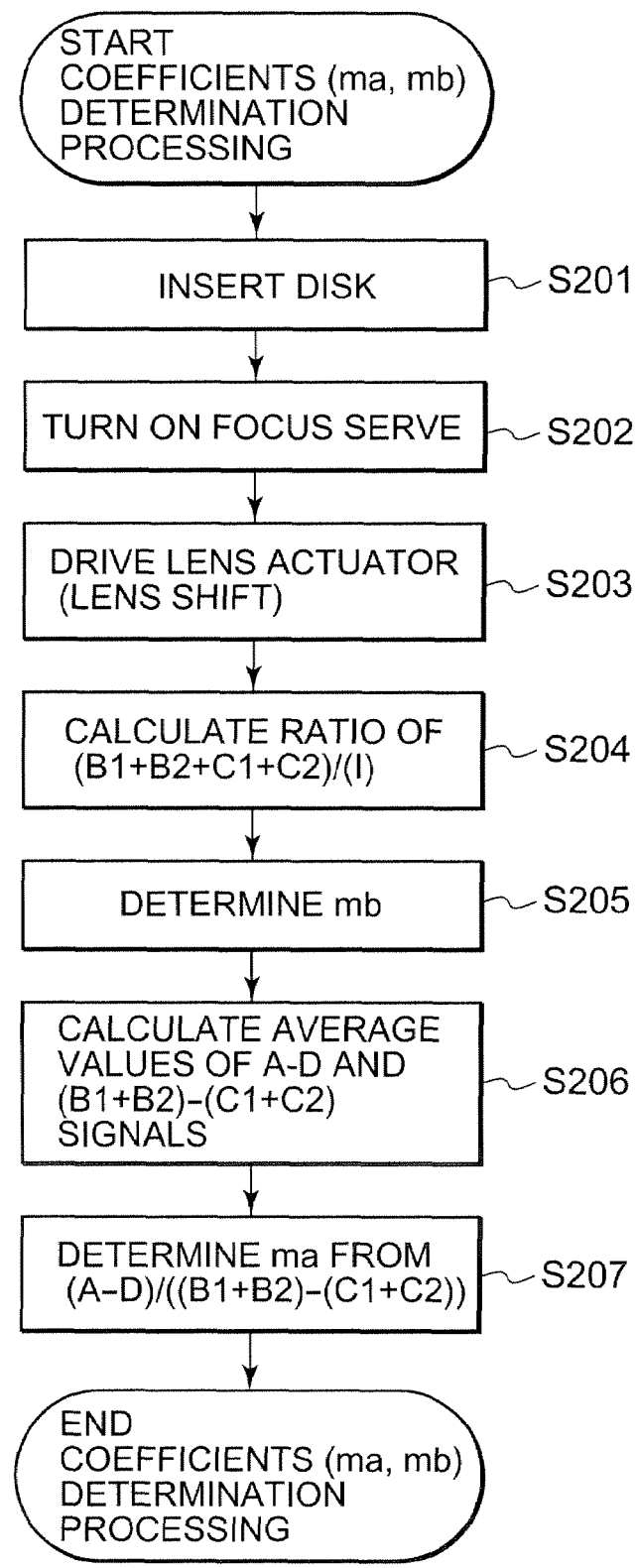
FIG. 13 is a diagram showing a flowchart illustrating the processing sequence of calculating the correction coefficient ma in the calculation formula of the track error signal Tr of the second embodiment.

Moreover, in the configuration of the light receiving elements used for the track error calculations, an output of the photodetector PD1 109 composed of seven divided light receiving elements describe with reference to the part (a) of FIG. 3. But, as described above, at the time of the calculation of a focus error, a signal of the photodetector PD1 109 composed of seven divided light receiving elements shown in the part (a) of FIG. 3, and a signal of the photodiode PD2 110 composed of three divided light receiving elements shown in the part (b) of FIG. 13 are applied. That is, the focus error signal Fo uses a signal acquired by the calculation in conformity with the formula Fo=I−(A+D+B1+B2+C1+C2)+E+H−J.

In the focus error signal Fo calculation formula, a signal I of the light receiving element I at the center of the photodetector PD1 109 in a radical direction, and a signal J of the light receiving element J of the photodetector PD2 110 at the center in the radial direction are important signals. But, the signals I and J are not applied to the track error signal Tr calculation formula, i.e. Tr=(A−D)−ma{(B1+B2)−(C1+C2)}, and the width of each of the light receiving elements I and J for acquiring the signals I and J can be designed so that the signal quality of the focus error signal Fo may be the optimal.

Second Embodiment

Next, a description is given to a track error signal Tr calculation configuration capable of outputting an accurate track error signal even at the time of a focus error, i.e. at the time of the generation of a focus shift, by further improving the track error signal Tr calculation formula, i.e. Tr=(A−D)−ma{(B1+B2)−(C1+C2)}, which has been applied to the first embodiment mentioned above. In addition, as the apparatus configuration and the photodetector configuration, the same configurations as those described in the first embodiment with reference to FIGS. 1-3 are applied.

Also in the present embodiment, the focus error signal Fo and the track error signal Tr are acquired by using the photodiode PD1 109 shown in the part (a) of FIG. 3, which is composed of seven divided light receiving elements A, B1, B2, C1, C2 D and I in total produced by being divided into three portions in a radial direction (in a radial direction of the disk) in a pattern symmetry to the center line, and the light receiving potions at both ends other than the central portion I of which are severally divided further divided into three portions (B1, A, B2) and (C1, D, C2) in the track direction, and by using the photodetector PD2 110 shown in the part (b) of FIG. 3, which is divided into three portions in a radial direction (in a radial direction of the disk) in a pattern symmetry to the center line to be three divided light receiving elements E, H and J in total.

Focus error signal Fo is detected by the spot size method similarly to the previous first embodiment. That is, it is acquired by the operation of Fo=I−(A+D+B1+B2+C1+C2)+E+H−J. In addition, each of the letters A-J denotes an output value acquired based on the received light quantity of a light spot in each of the light receiving elements A-J.

On the other hand, the track error signal Tr is calculated in conformity with Tr=(A−D)−{ma/(B1+B2+C1+C2+mbI)}{(B1+B2)−(C1+C2)}.

Here, the letter ma is the correction coefficient ma to correct the influences by lens shifts of the track error signal calculated in the first embodiment. The letter mb is a second correction coefficient newly applied in the present embodiment.

The occurrence of the track error and the occurrence of the focus error are phenomena that occur at the same time. The track error signal $Tr=(A-D)-ma\{(B1+B2)-(C1+C2)\}$, which has been described relative to the first embodiment, may contain an error owing to the occurrence of a focus error. The present second embodiment is an embodiment set to be able to output the track error signal Tr equivalent to a displacement to a track even if a focus error, i.e. a focus shift, occurs.

In the present embodiment, the track error signal Tr to be applied is calculated by the formula $Tr=(A-D)-\{ma/(B1+B2+C1+C2+mbI)\}\{(B1+B2)-(C1+C2)\}$. That is, the correction coefficient ma applied in the first embodiment is changed to $\{ma/(B1+B2+C1+C2+mbI)\}$.

Here, two signals of the (B1+B2+C1+C2) signal and the I signal as the signal elements included in the track error signal Tr calculation formula are considered.

Figure 10A:
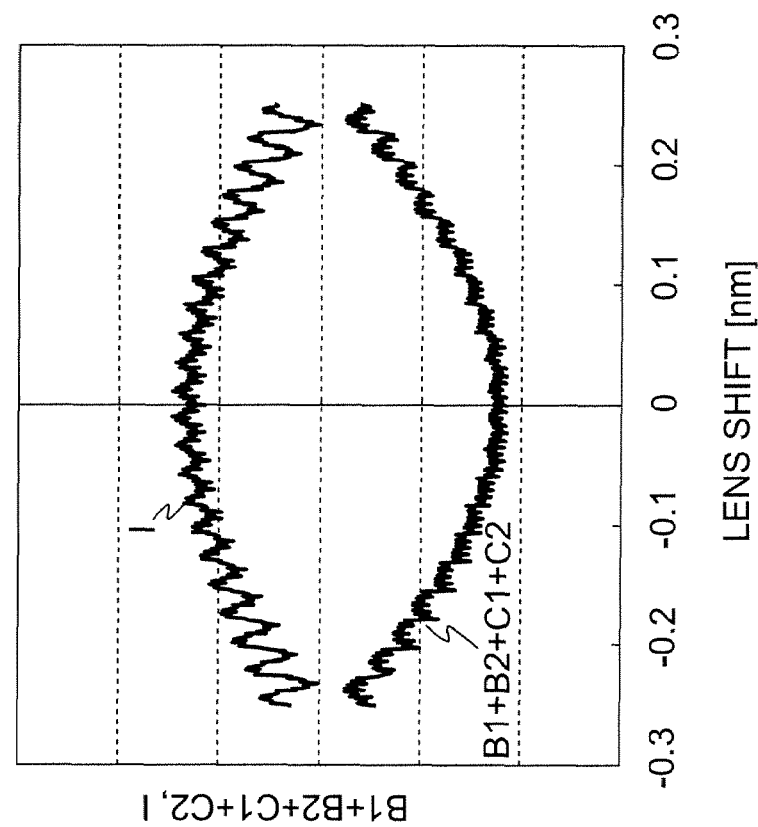
FIGS. 10A and 10B are diagrams showing graphs illustrating changes of the element signals of a track error signal to focus shifts and lens shifts, respectively, in a second embodiment of the present invention.
Figure 10B:
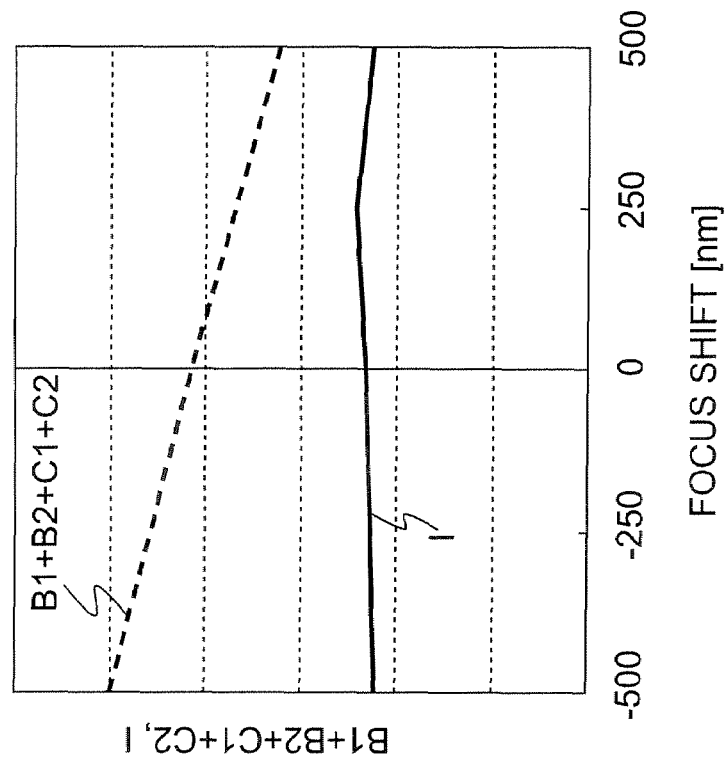

Graphs expressing the changes of these two signals, (B1+B2+C1+C2) signal and I signal, to focus shifts and lens shifts are shown in FIGS. 10A and 10B, respectively.

As shown in FIG. 10A, the (B1+B2+C1+C2) signal linearly changes in DC level to the focus shifts, and as shown in FIG. 10B, changes as a function convex downward to the lens shifts.

On the other hand, the I signal is not so much influenced by the focus shifts to be small in change quantity as shown in FIG. 10A, and changes as a function convex upward to the lens shifts as shown in FIG. 10B contrary to the (B1+B2+C1+C2) signal.

Accordingly, the generation of errors of the track error signal owing to the focus shifts can be suppressed by calculating a focus shift correction signal as the data adding the (B1+B2+C1+C2) signal to the I signal, which inversely changes, multiplied by the second correction coefficient mb, i.e. the focus shift correction signal=B1+B2+C1+C2+mbI, and by changing the correction coefficient ma, which has been applied in the first embodiment, to ma/(B1+B2+C1+C2+mbI) in order to suppress the influences of the changes of the (B1+B2+C1+C2) signal caused by the lens shifts.

Figure 11:
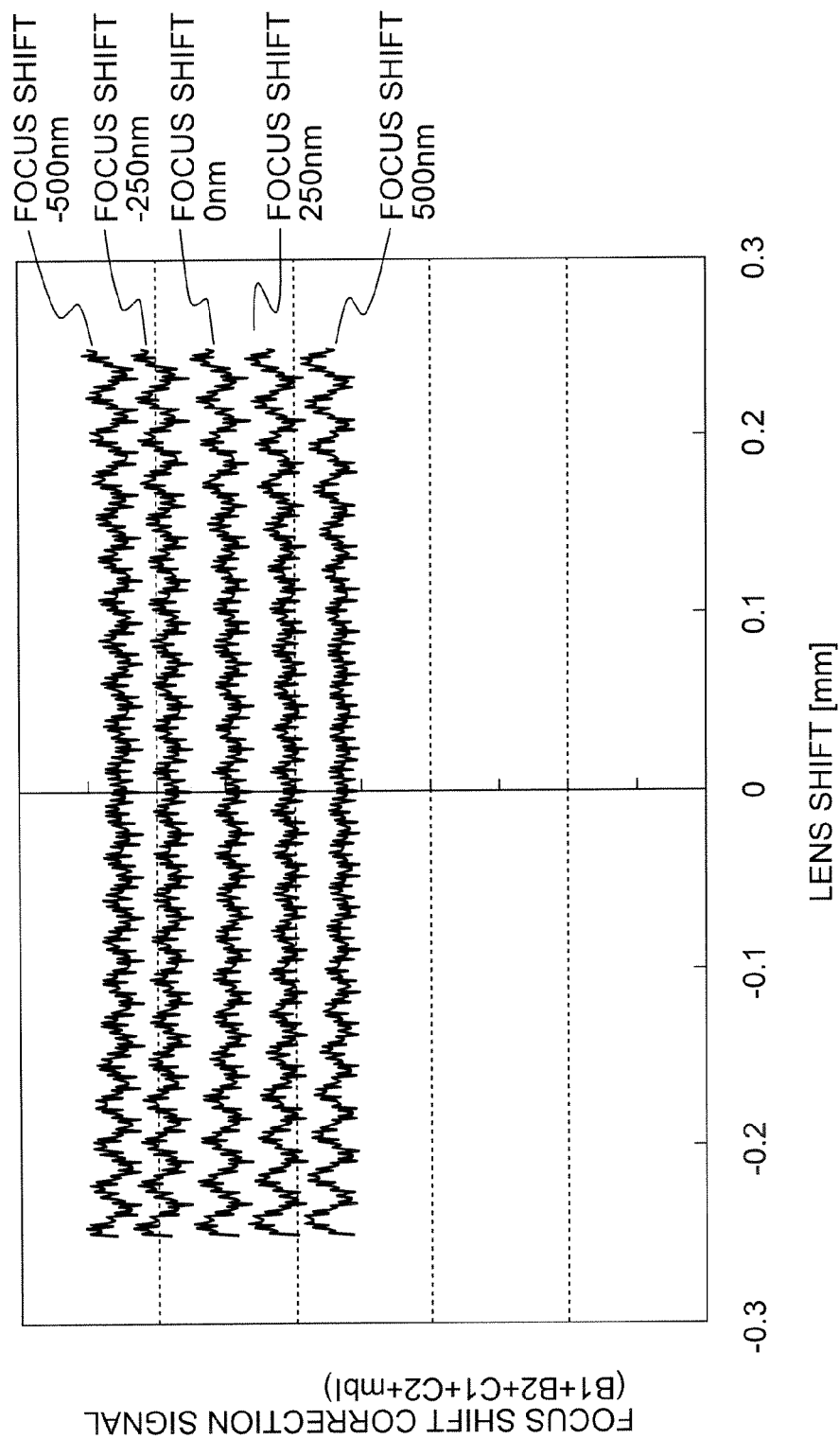
FIG. 11 is a diagram showing a graph illustrating a setting condition of a correction coefficient mb in a track error signal calculation formula in the second embodiment of the present invention.

To put it concretely, there is applied the second correction coefficient mb set so that the data acquired by adding the (B1+B2+C1+C2) signal and the I signal, which inversely changes to the (B1+B2+C1+C2) signal, multiplied by the predetermined second correction coefficient mb ma be an almost invariable value to the lens shifts as shown in FIG. 11. FIG. 11 is a graph showing the values of the focus shift correction signal=B1+B2+C1+C2+mbI corresponding to the lens shift within a range of +from −0.3 mm to +0.3 mm in correspondence to each of the focus shifts within a range of from −500 nm to 500 nm.

In this way, the generation of errors of the track error signals caused by the focus shirts can be suppressed by adopting the configuration of acquiring the correction coefficient mb so that the value of adding the signal component (B1+B2+C1+C2) to the signal component I multiplied by the correction coefficient mb, B1+B2+C1+C2+mbI, may be almost equal values to the lens shifts to calculate the track error signal Tr in conformity with the formula $Tr=(A-D)-\{ma/(B1+B2+C1\ v\ C2+mbI)\}\{(B1+B2)-(C1+C2)\}$.

Figure 12:
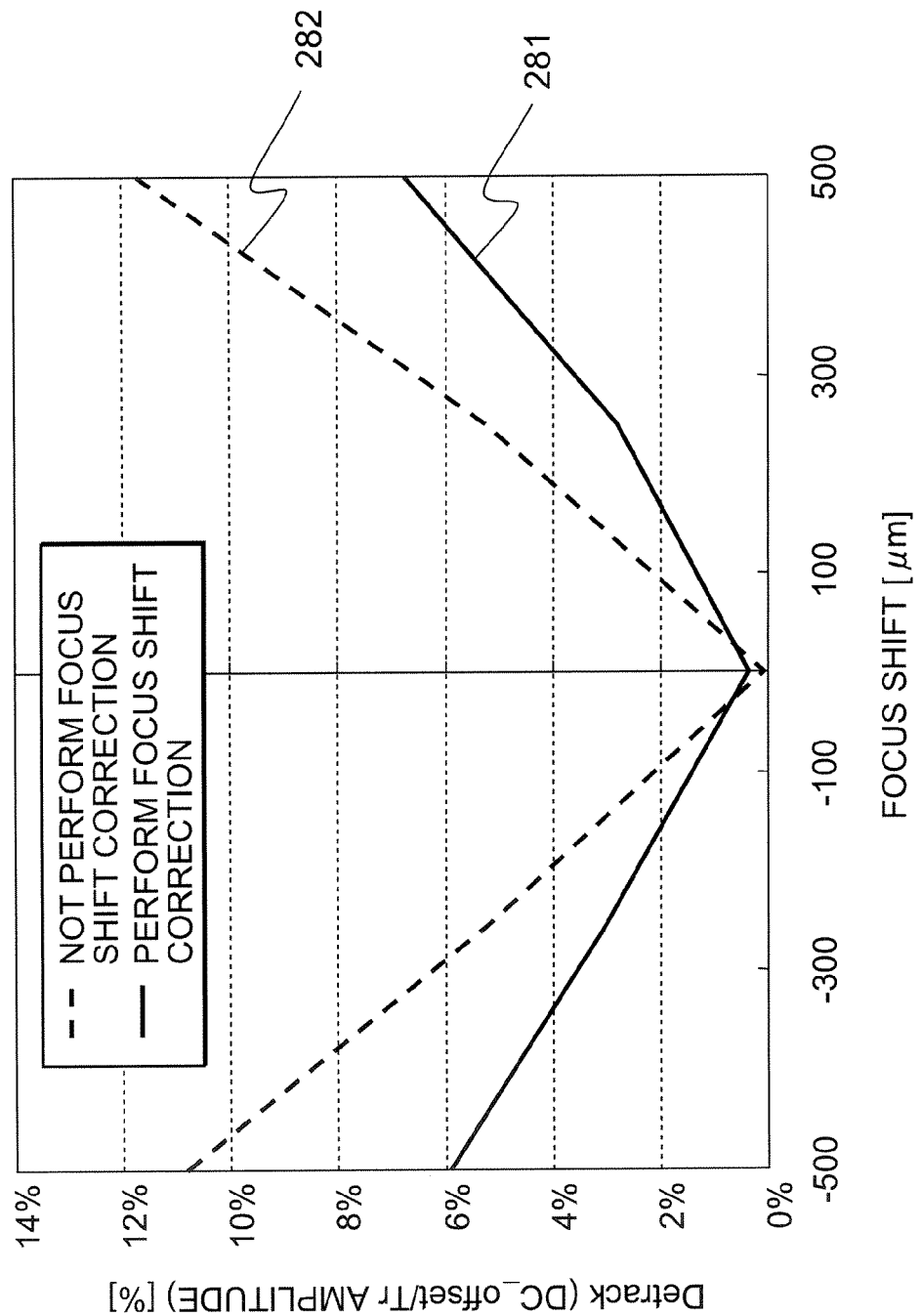
FIG. 12 is a diagram showing a graph illustrating the differences of influences to focus shifts in the case of applying the track error signal calculation formula in the second embodiment of the present invention and the track error signal calculation formula in the first embodiment.

The graph shown in FIG. 12 is a graph showing the correspondence of the focus shifts and the track errors. A dotted line 282 shows the track errors (Detrack) in the case where the track servo is executed pursuant to the track error signal Tr calculation formula described in the previous first embodiment, i.e. $Tr=(A-D)-ma\{(B1+B2)-(C1+C2)\}$, and a solid line 281 shows the track errors (Detrack) in the case where the track servo is executed pursuant to the track error signal Tr calculation formula of the present embodiment, i.e. $Tr=(A-D)-\{ma/(B1+B2+C1+C2+mbI)\}\{(B1+B2)-(C1+C2)\}$.

The control based on the track error signal Tr of the present embodiment is less affected by the focus shirts, and can execute the track+servo based on the good track error detection.

The calculation processing sequence of the coefficients ma and mb in the track error signal Tr calculation formula in the present embodiment, i.e. $Tr=(A-D)-\{ma/(B1+B2+C1+C2+mbI)\}\{(B1+B2)-(C1+C2)\}$, is described with reference to FIG. 13.

First, at Step S201, when the optical disk is inserted in the drive, the focus servo is turned on at Step S202. Next, at Step S203, a DC drive current is flowed in the objective lens actuator to shift the lens by a fixed amount. This is the processing of shifting the objective lens 105 of the optical pickup 100 shown in FIG. 2 in a radial direction by a fixed distance. The shift distance may be a predetermined arbitrary distance.

At Step S204, the (B1+B2+C1+C2) signal and the I signal at the time of the execution of the shift processing of the fixed distance are calculated, and a ratio of the calculated two signals, i.e. the signal ratio (B1+B2+C1+C2)/I, is calculated. At Step S105, the correction coefficient mb is set as mb=(B1+B2+C1+C2)/I.

The processing at the succeeding Steps S206 and S207 are similar to the calculation processing of the correction coefficient ma executed in the first embodiment.

At Step S206, a ratio between the A−D signal, A−D, and the $\{(B1+B2)-(C1+C2)\}$ signal, (B1+B2)−(C1+C2), namely $(A-D)/\{(B1+B2)-(C1+C2)\}$, at the time of the execution of the shift processing of the fixed distance is calculated, and at Step S207, the correction coefficient ma is set as ma=(A−D)/$\{(B1+B2)-(C1+C2)\}$.

In addition, the average value of the detection value of each signal level is applied as the value of each signal similarly to the processing described pertaining to the first embodiment with reference to FIG. 5.

The correction coefficients ma and mb calculated by the processing mentioned above are set as the coefficients ma and mb in the track error signal Tr calculation formula, i.e. Tr= $(A-D)-\{ma/(B1+B2+C1+C2+mbI)\}\{(B1+B2)-(C1+C2)\}$.

By the track error signal detection applying the track error signal Tr calculation formula, i.e. $Tr=(A-D)-\{ma/(B1+B2+C1+C2+mbI)\}\{(B1+B2)-(C1+C2)\}$, the influences owing to the focus shifts become smaller and the track servo based on the good track error detection can be executed.

Third Embodiment

Next, a description is given to a track error signal Tr calculation configuration enabling the output of a correct track error signal even at the time of the occurrence of a focus error, i.e. the occurrence of a focus shift, by changing the track error signal Tr calculation formula applied to the first embodiment mentioned above, i.e. $Tr=(A-D)-ma\{(B1+B2)-(C1+C2)\}$, in the manner different from that of the second embodiment. In addition, the apparatus configuration and the photodetector configuration similar to those described with reference to FIGS. 1-3 in the first embodiment are applied as those of the present embodiment.

The present embodiment also uses the photodetector PD1 109 shown in the part (a) of FIG. 3, which is divided into three portions in a radial direction (a radial direction of the disk) in the pattern symmetry to the center line and the light receiving portions on both the ends other than the central portion I are severally divided into three portions (B1, A, B2) and (C1, D, C2) to be composed of seven divided light receiving elements A, B1, B2, C1, C2, D and I in total, and the photodetector PD2 110 shown in the part (b) of FIG. 3, which is divided into three portions in a radial direction (a radial direction of the disk) in a pattern symmetry to the center line to be composed of three divided light receiving elements E, H and J in total, to acquire the focus error signal Fo and the track error signal Tr.

The focus error signal Fo is detected by the spot size method similarly to the previous first embodiment. That is, the focus error signal Fo is acquired by the operation of Fo=I−{(A+D+B1+B2+C1+C2)}+E+H−J. In addition, each letter of A-J denotes the output value acquired based on the received light quantity of the light spot in each of the light receiving elements A-J.

On the other hand, the track error signal Tr is calculated pursuant to Tr=(A=D)−mc(E−H)−ma{(B1+B2)−(C1+C2)}.

Here, the letter ma is the correction coefficient ma to correct the influences caused by the lens shifts of the track error signal calculated in the first embodiment. The letter mc denotes a third correction coefficient newly applied in the present embodiment.

Here, the two signals of the A−D signal and the E−H signal as the signal elements included in the above track error signal Tr calculation formula are considered.

Figure 14:
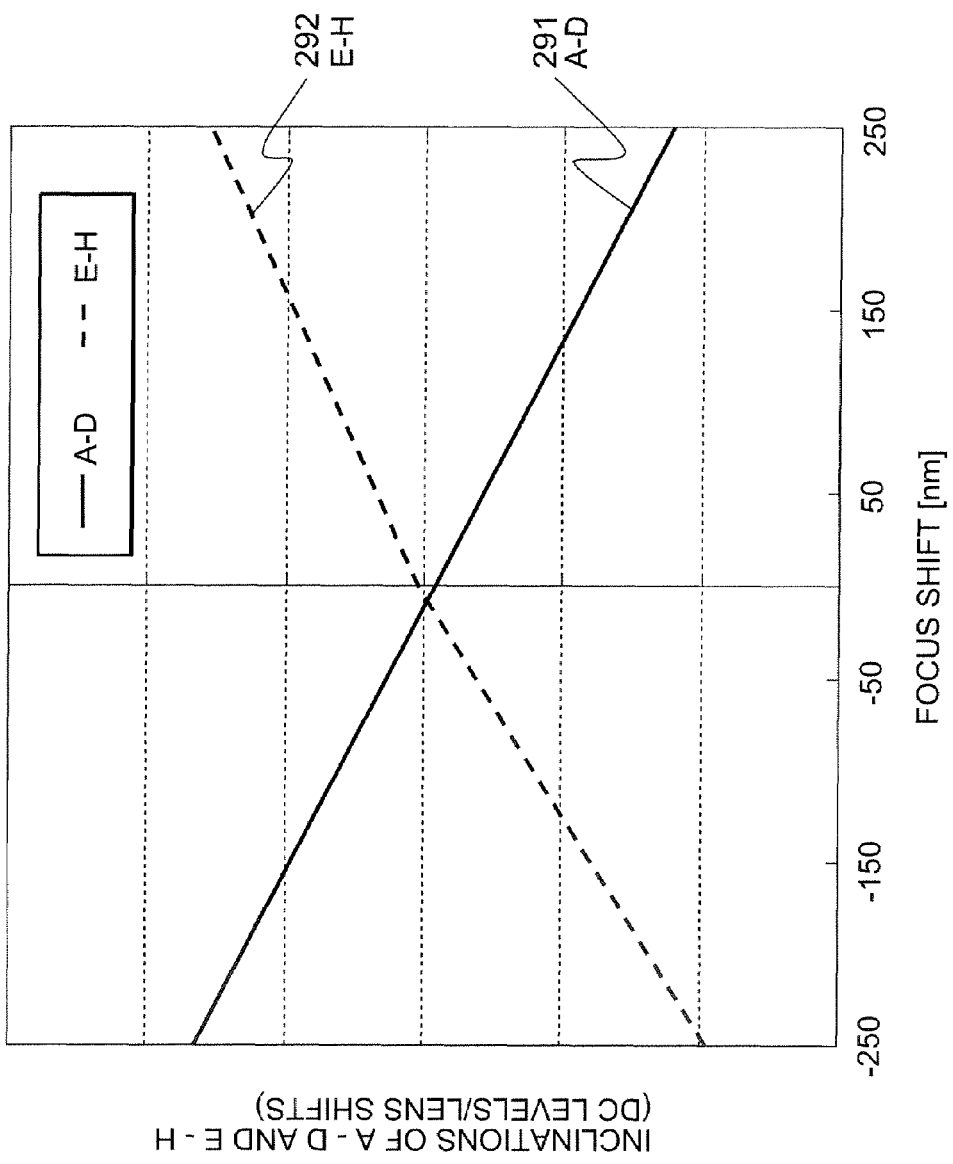
FIG. 14 is a diagram showing a graph illustrating the setting of the track error signal calculation formula in a third embodiment of the present invention.

A graph showing the correspondence between the focus shifts and the signal inclination (DC levels/lens shifts) of each of these two signals of the A−D signal and the E−H signals is shown in FIG. 14. FIG. 14 shows the signal inclination (DC levels/lens shifts) of the two signals of the A−D signal 291 and the E−H signal 292 to the focus shifts within a range of from −250 nm to +250 nm.

AS shown in FIG. 14, the A−D signal 291 and the E−H signal 292 changes inversely to each other to the focus shifts. Based on the behavior, an element mc(E−H) is operated as an element absorbing errors in the element (A−D) at the time of the occurrence in the track error signal Tr calculation formula in the present embodiment, i.e. Tr=(A−D)−mc(E−H)−ma{(B1+B2)−(C1+C2)}. That is, the correction coefficient mc is set so that the error occurring at the time of the occurrence of the focus shift of the signal component (A−D) may be cancelled by a value of the signal component (E−H) multiplied by the correction coefficient mc.

In such a way, the optimum correction coefficient mc to absorb the error of the element (A−D) at the time of the occurrence of the focus shift is calculated, and the calculation of the track error is performed based on the track error signal Tr calculation formula, i.e. Tr=(A−D)−mc(E−H)−ma{(B1+B2)−(C1+C2)}. Thereby, accurate track error detection can be achieved even at the time of the occurrence of a focus shift.

Figure 15:
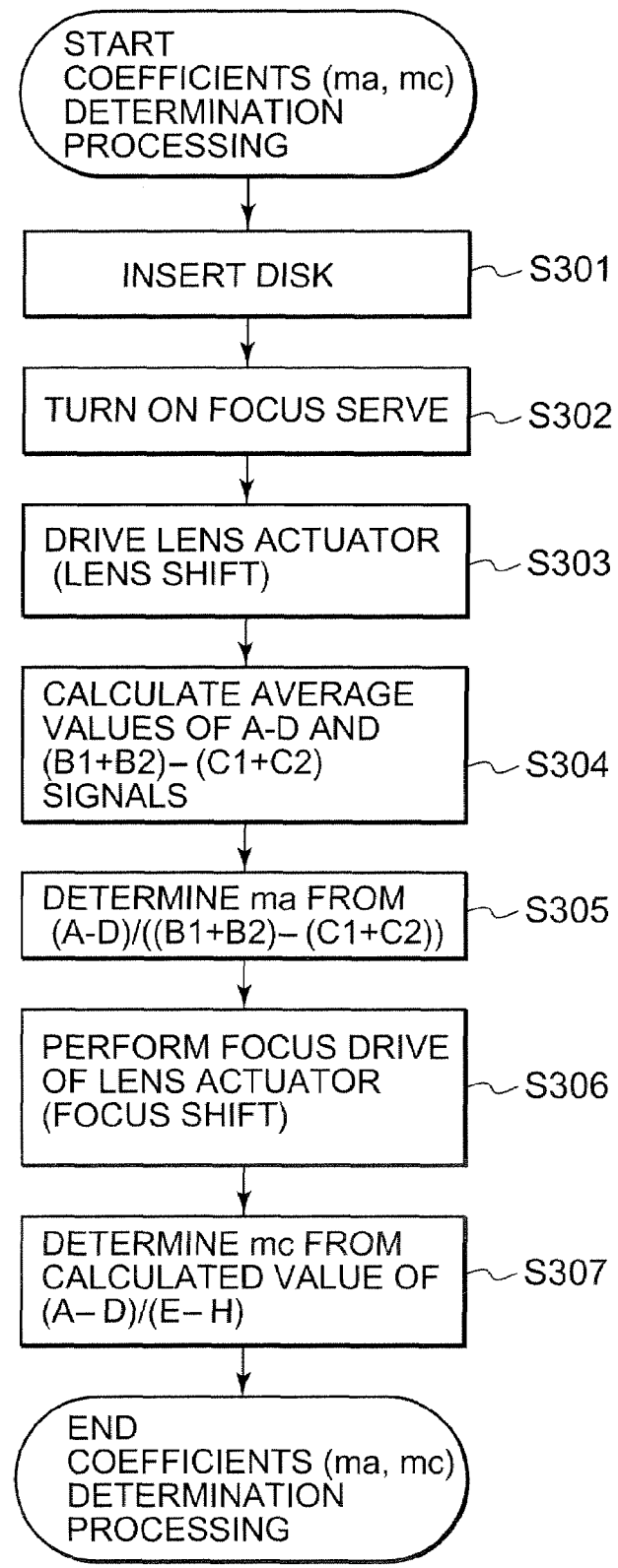
FIG. 15 is a diagram showing a flowchart illustrating the processing sequence of calculating the correction coefficient ma in the calculation formula of the track error signal Tr of a third embodiment.

The calculation processing sequence of the coefficients ma and mc in the track error signal Tr calculation formula of the present embodiment, i.e. Tr=(A−D)−mc(E−H)−ma{(B1+B2)−(C1+C2)}, is described with reference to FIG. 15.

First, at Step S301, when the optical disk is inserted into the drive, the focus servo is turned on at Step S302. Next, at Step S303, the DC drive current is flowed in the objective lens actuator to shift the lens by a fixed amount. This is the processing of shifting the objective lens 105 of the optical pickup 100 shown in FIG. 2 in a radial direction of the disk 106 by a fixed amount. The shift distance may be an arbitrary predetermined distance.

At Step S304, a ratio between the A−D signal, A−D, and the {(B1+B2)−(C1+C2)} signal, (B1+B2)−(C1+C2), at the time of the execution of the shift processing of the fixed distance, i.e. (A−D)/{(B1+B2)−(C1+C2)}, is calculated. At Step S305, the correction coefficient ma is set as ma=(A−D)/{(B1+B2)−(C1+C2)}.

Next, the focus control of the lens actuator in the optical pickup 100 is executed, and a focus shift is intentionally generated. The focus shift is generated within a predetermined arbitrary range, for example, a focus shift of about 250 nm is generated. Next, at Step S307, in the focus shift state, a ratio of the A−D signal and the E−H signal, i.e. (A−D)/(E−H), is calculated, and the correction coefficient mc is set as mc=(A−D)/(E−H).

The correction coefficients ma and mc calculated by the above processing are set as the coefficients ma and mc in the track error signal Tr calculation formula, i.e. Tr=(A−D)−mc(E−H)−ma{(B1+B2)−(C1+C2)}, in the present embodiment.

By the track error signal detection to which the track error signal Tr calculation formula Tr=(A−D)−mc(E−H)−ma{(B1+B2)−(C1+C2)} is applied, the influences by the focus shifts become small, and the track servo by excellent track error detection is executed.

[Configuration Example of Pickup]

The calculation processing of the track error signal Tr and the focus error signal Fo based on the processing of each of the first to the third embodiments can be applied to pickups having various configurations. The pickup described with reference to FIGS. 1 and 2 is an example of them. Furthermore, a pickup configuration realizing miniaturization is described with reference to FIG. 16.

Figure 16:
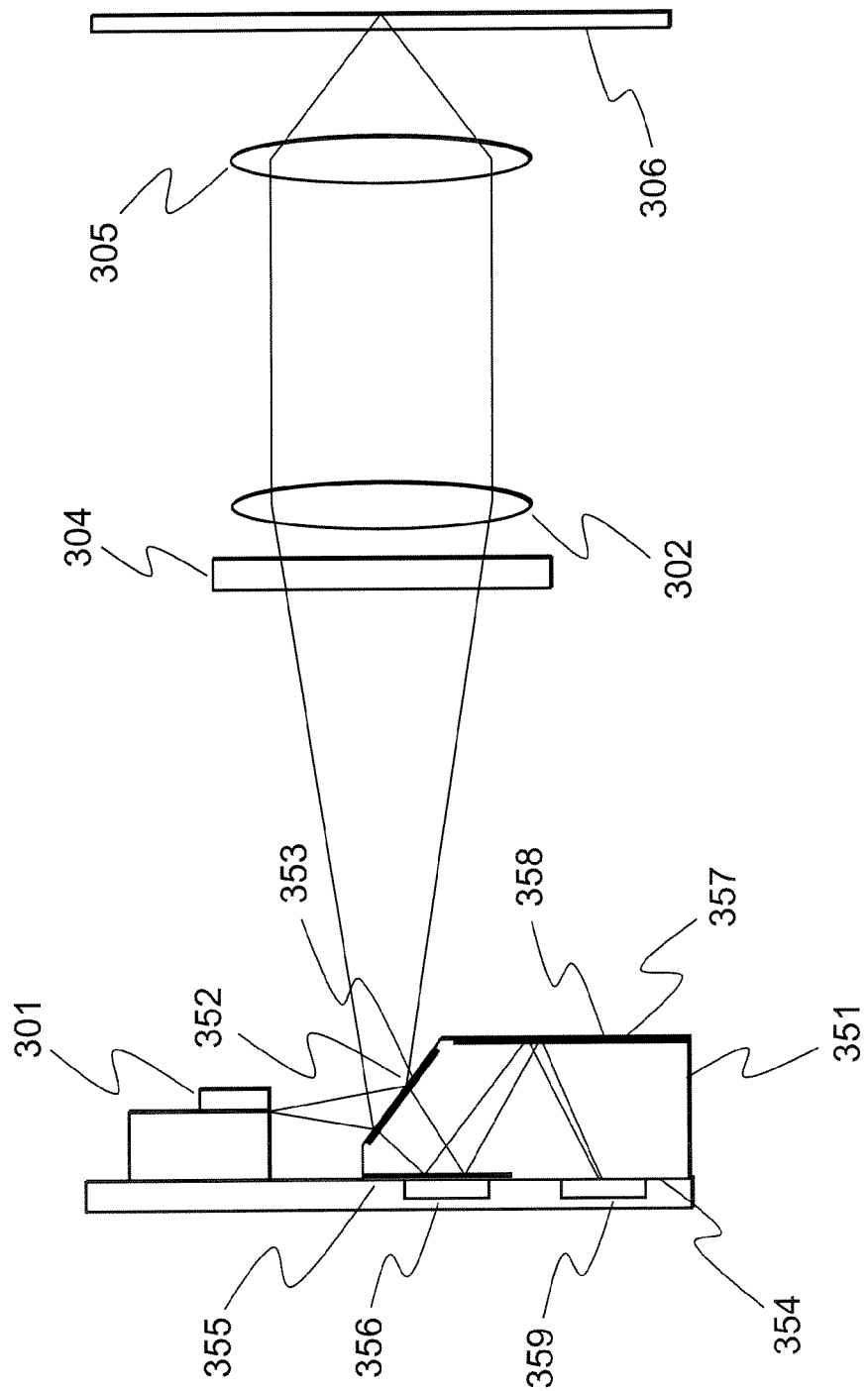
FIG. 16 is a diagram illustrating a configuration example of a pickup to which the present invention can be applied.

The detection processing configuration of the track error signal Tr and the focus error signal Fo in the pickup of FIG. 16 is described.

The light emitted from a semiconductor laser 301 is reflected by a PBS film 353 formed on a surface inclined by 45 degrees of a prism 351 by 45 degrees, and is converted into a circularly polarized light by a quarter wavelength plate 304. After that, the converted light is collimated by a collimator lens 302 to be condensed on an optical disk 306 by an objective lens 305.

The light reflected by the optical disk 306 transmits the objective lens 305, the collimator lens 302 and the quarter wavelength plate 304, and is converted into a linearly polarized light perpendicular to the approach route polarized light. The light converted into the linearly polarized light transmits the PBS film 353 on the surface inclined by 45 degrees 352 of the prism 351, and is divided into a light transmitting a half mirror film 355 on a prism bottom face 354 by 50% and a light reflected by 50%. The light having transmitted the half mirror film 355 is received by a photodetector PD1 356 disposed on the prism bottom face 354. On the other hand, the light reflected by the half mirror film 355 is reflected by a mirror court 358 on a prism top face 357, and enters the prism bottom face 354 again. The light having entered the prism bottom face 354 is received by a photodetector PD2 359 disposed on the prism bottom face 354.

In the pickup configuration, the photodetector PD1 356 and the photodetector PD2 359 have the photodetector configurations shown in the parts (a) and (b) of FIG. 3, respectively. That is, the photodetector PD1 356 is, as shown in the part (a) of FIG. 3, divided into three parts in a radial direction (a radial direction of the disk) in a pattern symmetry to the center line, and the light receiving portions on the both ends other than the central portion I are severally divided into three portions (B1, A, B2) and (C1, D, C2) in the track direction. Then the photodetector PD1 356 is set to be a photodetector composed of seven divided light receiving elements A, B1, B2, C1, C2, D and I in total.

Moreover, the photodetector PD2 359 is, as shown in the part (b) of FIG. 3, is set as a photodetector composed of three divided light receiving elements E, H and J in total by being divided into three portions in a radial direction (a radial direction of the disk) in a pattern symmetry to the center line.

Even in such a miniaturized pickup configuration, the control in which the track error signal Tr and the focus error signal Fo described pertaining to the first to the third embodiments are applied is realized.

In the above, the specific embodiments have been referred while the present invention is described in detail. However, it is obvious that the skilled in the art can modify or substitute the embodiments within the range without departing from the scope and the spirit of the present invention. That is, the present invention has been disclosed in the form of exemplification, and it should not be interpreted limitedly. It is necessary to take claims into consideration to judge the scope of the present invention.

The present invention contains subject mater related to Japanese Patent Application No. JP2005-252650 filed in the Japanese Patent Office on Aug. 31, 2005, the entire contents of which being incorporated herein by reference.

What is claimed is:

1. An optical pickup to be applied to recording or reproducing information to an optical disk, comprising:
 a first photodetector for detecting a return light from said optical disk;
 wherein said first photodetector is configured so that said first photodetector is divided into three portions in a radial direction corresponding to a radial direction of said optical disk and light receiving elements at both end portions in the radial direction are divided into three portions in substantially a track direction perpendicular to the radial direction, so that said first photodetector includes a light receiving element at a central portion in the radial direction and the three light receiving portions at each of both the end portions to be seven in total to output a light receiving element signal based on light reception of the return light as a track error signal generation signal.

2. The optical pickup according to claim 1, further comprising a second photodetector; and
 wherein said first photodetector is disposed at a position shifted from a focus position of the return light from said optical disk by a distance L, and said second photodetector is disposed at a position shifted from a focus position of the return light from said optical disk by the distance L in a reverse direction to a direction of said first photodetector;
 wherein said second photodetector has three light receiving elements divided into three portions in a radial direction corresponding to a radial direction of said optical disk, and
 wherein each of light receiving element signals of said first photodetector and said second photodetector are output as the track error signal generation signal and a focus error signal generation signal, respectively.

3. An information processing apparatus executing information recording processing or information reproducing processing in each of which an optical disk is applied, said apparatus comprising:
 an optical pickup radiating a light to said optical disk and executing detection processing of a return light from said optical disk; and
 a signal processing unit generating a control signal based on a detection light of said optical pickup;
 wherein said optical pickup includes a first photodetector for detecting the return light from said pickup,
 wherein said first photodetector is configured so that said first photodetector is divided into three portions in a radial direction corresponding to a radial direction of said optical disk and light receiving elements at both end portions in the radial direction are divided into three portions in substantially a track direction perpendicular to the radial direction, so that said first photodetector includes a light receiving element at a central portion in the radial direction and the three light receiving portions at each of both the end portions to be seven in total to output a light receiving element signal based on light reception of the return light as a track error signal generation signal, and
 wherein said signal processing unit is configured to receive an input of the light receiving element signal from said optical pickup to generate the track error signal.

4. The information processing apparatus according to claim 3,
 wherein said optical pickup further comprises a second photodetector;
 wherein said first photodetector is disposed at a position shifted from a focus position of the return light from said optical disk by a distance L, and said second photodetector is disposed at a position shifted from a focus position of the return light from said optical disk by the distance L in a reverse direction to a direction of said first photodetector;
 wherein said second photodetector is configured to have three light receiving elements divided into three portions in a radial direction corresponding to a radial direction of said optical disk to output each of light receiving element signals of said first photodetector and said second photodetector as the track error signal generation signal and a focus error signal generation signal, respectively, and
 wherein said signal processing unit is configured to generate the track error signal and the focus error signal based on each of the light receiving element signals of said first photodetector and said second photodetector, respectively.

5. The information processing apparatus according to claim 3, wherein said signal processing unit is configured to execute processing of generating the track error signal Tr in accordance with a following formula, $Tr=(A-D)-ma\{(B1+B2)-(C1+C2)\}$, where ma is a correction coefficient, based on a difference signal (A−D) of signals from two light receiving elements at a center of three divided light receiving elements in substantially the track direction, which elements exist in each of both the end portions in the radial direction corresponding to the radial direction of said optical disk, and a difference signal, (B1+B2)−(C1+C2), of sum signals (B1+B2) and (C1+C2) of two light receiving elements at end portions in the track direction among three divided light receiving elements substantially in the track direction in each of the end portions in the radial direction among light receiving element signals input from said first photodetector.

6. The information processing apparatus according to claim 5, wherein said signal processing unit is configured so that said signal processing unit sets the correction coefficient ma based on a ratio of inclinations of DC offsets, according to lens shifts to the radial direction, of signal components (A−D) and $\{B1+B2-(C1+C2)\}$ and said signal processing unit executes processing of generating the tack error signal Tr based on the calculation formula $Tr=(A-D)-ma\{(B1+B2)-(C1+C2)\}$.

7. The information processing apparatus according to claim 3, wherein said signal processing unit is configured to execute processing of generating the track error signal Tr in accordance with a following formula, $Tr=(A-D)-\{ma/(B1+B2+C1+C2+mbI)\}\{(B1+B2)-(C1+C2)\}$, where ma and mb are correction coefficients, based on a signal I of a light receiving element located at a center of the radial direction corresponding to the radial direction of said optical disk, a difference signal (A–D) of signals from two light receiving elements at a center of the three divided light receiving elements in substantially the track direction, which elements exist in each of both the end portions in the radial direction corresponding to the radial direction of said optical disk, and a difference signal, $\{(B1+B2)-(C1+C2)\}$ of sum signals (B1+B2) and (C1+C2) of two light receiving elements at end portions in the track direction among three divided light receiving elements substantially in the track direction in each of the end portions in the radial direction among light receiving element signals input from said first photodetector.

8. The information processing apparatus according to claim 7, wherein said signal processing unit is configured so that said signal processing unit sets the correction coefficient ma based on a ratio of inclinations of DC offsets, according to lens shifts to the radial direction, of signal components (A–D) and $\{(B1+B2)-(C1+C2)\}$ and sets the correction coefficient mb in order that a value (B1+B2+C1+C2+mbI) acquired by adding a signal component (B1+B2+C1+C2) and a multiplication value of the correction coefficient mb and a signal component I may be a value almost uniform to the lens shifts, and so that the signal processing unit executes processing of generating the tack error signal Tr based on the calculation formula $Tr=(A-D)-\{ma/(B1+B2+C1+C2+mbI)\}\{(B1+B2)-(C1+C2)\}$.

9. The information processing apparatus according to claim 4, wherein said signal processing unit is configured to execute processing of generating the track error signal Tr in accordance with a following formula, $Tr=(A-D)-mc(E-H)-ma\{(B1+B2)-(C1+C2)\}$, where ma and mc are correction coefficients, based on a difference signal (A–D) of signals from two light receiving elements at a center of three divided light receiving elements in substantially the track direction, which elements exist in each of both the end portions in the radial direction corresponding to the radial direction of the optical disk, and a difference signal $\{(B1+B2)-(C1+C2)\}$ of sum signals (B1+B2) and (C1+C2) of two light receiving elements at end portions in the track direction among three divided light receiving elements substantially in the track direction in each of the end portions in the radial direction among light receiving element signals input from the first photodetector, and further a difference signal (E–H) of signals of two light receiving elements located at both end portions of the radial direction corresponding to the radial direction of the optical disk among the light receiving element signals input from said second photodetector.

10. The information processing apparatus according to claim 9, wherein said signal processing unit is configured so that said signal processing unit sets the correction coefficient ma based on a ratio of inclinations of DC offsets, according to lens shifts to the radial direction, of signal components (A–D) and $\{(B1+B2)-(C1+C2)\}$ and sets the correction coefficient mc in order that an error produced at a time of an occurrence of a focus shift of the signal component (A–D) be canceled by a multiplication value of a signal component (E–H) and the correction coefficient mc, and so that said signal processing unit executes the processing of generating the tack error signal Tr based on the calculation formula $Tr=(A-D)-mc(E-H)-ma\{(B1+B2)-(C1+C2)\}$.

11. The information processing apparatus according to claim 4, wherein said signal processing unit is configured to execute processing of generating the focus error signal Fo in accordance with a following formula, $Fo=\{I-(A+D+B1+B2+C1+C2)\}+\{(E+H)-J\}$, based on a difference signal $\{I-(A+D+B1+B2+C1+C2)\}$ between a signal I of a light receiving element at a center in the radial direction corresponding to the radial direction of said optical disk and a total sum signal (A+D+B1+B2+C1+C2) of the three divided light receiving elements in substantially the track direction, which elements are located at each of both the end portions in the radial direction, among light receiving element signals input from said first photodetector, and a difference signal $\{(E+H)-J\}$ of a signal J of a light receiving element located at a center in the radial direction corresponding to the radial direction of the optical disk and a total sum signal (E+H) of two light receiving elements located at both end portions in the radial direction corresponding to the radial direction of said optical disk among the light receiving element signals input from said second photodetector.

12. A signal processing method of generating a control signal of an optical pickup, comprising the steps of:

inputting a light receiving element signal detected based on light reception of a return light from an optical disk in a first photodetector including light receiving elements divided into three portions in a radial direction corresponding to a radial direction of said optical disk, said light receiving elements located at both end portions in the radial direction divided into three portions in substantially a track direction perpendicular to the radial direction, said first photodetector including said light receiving element at a central portion in the radial direction and said three light receiving portions at each of both the end portions to be seven in total; and executing processing of generating a track error signal Tr in accordance with a following formula, $Tr=(A-D)-ma\{(B1+B2)-(C1+C2)\}$, where ma is a correction coefficient, based on a difference signal (A–D) of signals from two of said light receiving elements at the center of said three divided light receiving elements in substantially the track direction, which elements exist in each of both the end portions in the radial direction corresponding to the radial direction of said optical disk in said first photodetector, and a difference signal, $(B1+B2)-(C1+C2)$, of sum signals (B1+B2) and (C1+C2) of two light receiving elements at end portions in the track direction among said three divided light receiving elements substantially in the track direction in each of the end portions in the radial direction.

13. The signal processing method according to claim 12, wherein said track error signal generation step sets the correction coefficient ma based on a ratio of inclinations of DC offsets, according to lens shifts to the radial direction, of signal components (A–D) and $\{(B1+B2)-(C1+C2)\}$, and executes the processing of generating the tack error signal Tr based on the calculation formula $Tr=(A-D)-ma\{(B1+B2)-(C1+C2)\}$.

14. A signal processing method of generating a control signal of an optical pickup, comprising the steps of:

inputting a light receiving element signal detected based on light reception of a return light from an optical disk in a first photodetector including light receiving elements divided into three portions in a radial direction corresponding to a radial direction of said optical disk, said light receiving elements located at both end portions in the radial direction divided into three portions in substantially a track direction perpendicular to the radial direction, said first photodetector including said light receiving element at a central portion in the radial direction and said three light receiving portions at each of both the end portions to be seven in total; and executing processing of generating a track error signal Tr in accordance with a following formula, $Tr=(A-D)-\{ma/(B1+B2+C1+C2+mbI)\}\{(B1+B2)-(C1+C2)\}$, where ma and mb are correction coefficients, based on a signal I of said light receiving element located at the center of the radial direction corresponding to the radial direction of said optical disk in said first photodetector, a difference signal (A-D) of signals from two of said light receiving elements at the center of said three divided light receiving elements in substantially the track direction, which elements exist in each of both the end portions in the radial direction corresponding to the radial direction of said optical disk, and a difference signal $\{(B1+B2)-(C1+C2)\}$ of sum signals (B1+B2) and (C1+C2) of two of said light receiving elements at end portions in the track direction among said three divided light receiving elements substantially in the track direction in each of the end portions in the radial direction.

15. The signal processing method according to claim 14, wherein said track error signal generation step sets the correction coefficient ma based on a ratio of inclinations of DC offsets, according to lens shifts to the radial direction, of signal components (A-D) and $\{(B1+B2)-(C1+C2)\}$, sets the correction coefficient mb in order that a value (B1+B2+C1+C2+mbI) acquired by adding a signal component (B1+B2+C1+C2) and a multiplication value of the correction coefficient mb and the signal component I be a value almost uniform to the lens shifts, and executes the processing of generating the tack error signal Tr based on the calculation formula $Tr=(A-D)-\{ma/(B1+B2+C1+C2+mbI)\}\{(B1+B2)-(C1+C2)\}$.

16. A signal processing method of generating a control signal of an optical pickup, comprising the steps of:

inputting a light receiving element signal detected based on light reception of a return light from an optical disk in a first photodetector disposed at a position shifted from a focus position of the return light from said optical disk by a distance L, said first photodetector including light receiving elements divided into three portions in a radial direction corresponding to a radial direction of said optical disk, said light receiving elements located at both end portions in the radial direction divided into three portions in substantially a track direction perpendicular to the radial direction, said first photodetector including said light receiving element at a central portion in the radial direction and said three light receiving portions at each of both the end portions to be seven in total;

inputting a light receiving element signal detected based on light reception of the return light from said optical disk in a second photodetector disposed at a position shifted from a focus position of the return light from said optical disk by the distance L in a reverse direction to a direction of said first photodetector, said second photodetector having three light receiving elements divided into three portions in a radial direction corresponding to a radial direction of said optical disk, and executing processing of generating a track error signal Tr in accordance with a following formula, $Tr=(A-D)-mc(E-H)-ma\{(B1+B2)-(C1+C2)\}$, where ma and mc are correction coefficients, based on a difference signal (A-D) of signals from two of said light receiving elements at a center of said three divided light receiving elements in substantially the track direction, which elements exist in each of both the end portions in the radial direction corresponding to the radial direction of the optical disk in said first photodetector, a difference signal $\{(B1+B2)-(C1+C2)\}$ of sum signals (B1+B2) and (C1+C2) of two of said light receiving elements at end portions in the track direction among said three divided light receiving elements substantially in the track direction in each of the end portions in the radial direction, and a difference signal (E-H) of signals of two of said light receiving elements located at both end portions of the radial direction corresponding to the radial direction of the optical disk among light receiving element signals input from said second photodetector.

17. The signal processing method according to claim 16, wherein said track error signal generation step sets the correction coefficient ma based on a ratio of inclinations at DC offsets, according to lens shifts to the radial direction, of signal components (A-D) and $\{(B1+B2)-(C1+C2)\}$, sets the correction coefficient mc in order that an error produced at a time of an occurrence of a focus shift of the signal component (A-D) be canceled by a multiplication value of a signal component (E-H) and the correction coefficient mc, and executes the processing of generating the tack error signal Tr based on the calculation formula $Tr=(A-D)-mc(E-H)-ma\{(B1+B2)-(C1+C2)\}$.

18. A signal processing method of generating a control signal of an optical pickup, comprising the steps of:

inputting a light receiving element signal detected based on light reception of a return light from an optical disk in a first photodetector disposed at a position shifted from a focus position of the return light from said optical disk by a distance L, said firs photodetector including light receiving elements divided into three portions in a radial direction corresponding to a radial direction of said optical disk, said light receiving elements located at both end portions in the radial direction divided into three portions in substantially a track direction perpendicular to the radial direction, said first photodetector including said light receiving element at a central portion in the radial direction and said three light receiving portions at each of both the end portions to be seven in total;

inputting a light receiving element signal detected based on light reception of the return light from said optical disk in a second photodetector disposed at a position shifted from a focus position of the return light from said optical disk by the distance L in a reverse direction to a direction of said first photodetector, said second photodetector having three light receiving elements divided into three portions in a radial direction corresponding to a radial direction of said optical disk, and executing processing of generating a focus error signal Fo in accordance with a following formula, $Fo=\{I-(A+D+B1+B2+C1+C2)+(E+H)-J\}$, based on a difference signal $\{I-(A+D+B1+B2+C1+C2)\}$ between a signal I of said light receiving element at a center in the radial direction corresponding to the radial direction of said optical disk in said first photodetector and a total sum signal (A+D+B1+B2+C1+C2) of said three divided light receiving elements in substantially the track direction, which elements are located at each of both the end portions in the radial direction, and a difference signal $\{(E+H)-J\}$ of a signal J of said light receiving element located at a center in the radial direction corresponding to the radial direction of said optical disk and a total sum signal (E+H) of two of said light receiving elements located at both end portions in the radial direction corresponding to the radial direction of said optical disk among the light receiving element signals input from said second photodetector.

* * * * *